US012668380B2

(12) United States Patent
Xiao

(10) Patent No.: US 12,668,380 B2
(45) Date of Patent: Jun. 30, 2026

(54) AERIAL VEHICLE

(71) Applicant: SZ DJI TECHNOLOGY CO., LTD., Shenzhen (CN)

(72) Inventor: Xiang Xiao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 18 days.

(21) Appl. No.: 18/384,498

(22) Filed: Oct. 27, 2023

(65) Prior Publication Data

US 2024/0132237 A1 Apr. 25, 2024
US 2024/0228075 A9 Jul. 11, 2024

Related U.S. Application Data

(63) Continuation of application No. PCT/CN2021/091163, filed on Apr. 29, 2021.

(51) Int. Cl.
*B64U 20/50* (2023.01)
*B64U 10/14* (2023.01)
(Continued)

(52) U.S. Cl.
CPC ............. *B64U 20/50* (2023.01); *B64U 10/14* (2023.01); *B64U 10/20* (2023.01); *B64U 20/87* (2023.01);
(Continued)

(58) Field of Classification Search
CPC ........ B64U 10/20; B64U 29/02; B64U 20/50; B64U 30/293; B64U 2101/30; B64U 20/87; B64C 29/0025
See application file for complete search history.

(56) References Cited

U.S. PATENT DOCUMENTS 10,435,176 B2 * 10/2019 McClure ................ G05D 1/102
12,242,284 B2 * 3/2025 Baumgartner ......... B64U 20/87
(Continued)

FOREIGN PATENT DOCUMENTS

CN 102133926 A 7/2011
CN 106892102 A 6/2017
(Continued)

OTHER PUBLICATIONS

International Search Report and Written Opinion mailed on Feb. 8, 2022, received for PCT Application PCT/CN2021/091163, filed on Apr. 29, 2021, 9 pages including English Translation.

*Primary Examiner* — Kimberly S Berona
*Assistant Examiner* — Shanna Danielle Glover
(74) *Attorney, Agent, or Firm* — ANOVA LAW GROUP, PLLC

(57) ABSTRACT

An aerial vehicle may include a fuselage; and one or more propellers coupled to the fuselage, wherein the aerial vehicle may have at least a taking off or landing state and a cruise state. In response to the aerial vehicle being in the taking off or landing state, an angle between a longitudinal axis of the fuselage and a horizontal plane may be within a first angular range and in response to the aerial vehicle being in the cruise state, an angle between the longitudinal axis of the fuselage and the horizontal plane may be within a second angular range. A maximum value of the second angular range may be less than a minimum value of the first angular range. In response to the aerial vehicle switching between the takeoff or landing state and the cruise state, the fuselage and the propellers may tilt as a whole.

19 Claims, 15 Drawing Sheets

(51) Int. Cl.

| | |
|---|---|
| *B64U 10/20* | (2023.01) |
| *B64U 20/87* | (2023.01) |
| *B64U 30/293* | (2023.01) |
| *B64U 50/23* | (2023.01) |
| *B64U 101/30* | (2023.01) |

(52) U.S. Cl.
CPC ........... *B64U 30/293* (2023.01); *B64U 50/23* (2023.01); *B64U 2101/30* (2023.01)

(56) References Cited

U.S. PATENT DOCUMENTS

| | | | | |
|---|---|---|---|---|
| 2011/0001020 A1* | 1/2011 | Forgac | ............... | B64C 29/0033 244/7 A |
| 2013/0048792 A1* | 2/2013 | Szarek | .................. | H04N 7/183 244/175 |
| 2015/0014475 A1* | 1/2015 | Taylor | ................. | B64C 29/0025 244/6 |
| 2015/0367957 A1* | 12/2015 | Uskert | ................... | H04N 23/90 348/144 |
| 2018/0364548 A1* | 12/2018 | Peng | .................... | G03B 15/006 |
| 2019/0009878 A1* | 1/2019 | Wang | .................... | B64U 20/92 |
| 2019/0389573 A1* | 12/2019 | Kahou | .................. | B64U 70/83 |
| 2022/0081111 A1* | 3/2022 | Pei | ........................ | B64U 30/26 |
| 2022/0204152 A1* | 6/2022 | Campbell | ............. | B64U 10/20 |

FOREIGN PATENT DOCUMENTS

| | | | | | |
|---|---|---|---|---|---|
| CN | 108639328 A | * | 10/2018 | ............ | B64C 27/22 |
| CN | 208868285 U | | 5/2019 | | |
| CN | 110371303 A | | 10/2019 | | |
| CN | 210284608 U | | 4/2020 | | |
| CN | 212605801 U | | 2/2021 | | |
| EP | 1995174 A2 | | 11/2008 | | |
| WO | 20180076136 A1 | | 5/2018 | | |

* cited by examiner

AERIAL VEHICLE

CROSS-REFERENCE TO RELATED APPLICATION

The present application is a continuation of International Application No. PCT/CN2021/091163, filed Apr. 29, 2021, the entire contents of which being incorporated herein by reference in its entirety.

TECHNICAL FIELD

The present application relates to the field of aerial vehicles (UAVs), and in particular to an unmanned aerial vehicle.

BACKGROUND

A multi-rotor UAV is a kind of small UAV emerging in recent years, which is widely used in aerial photography, industry inspection, disaster relief operations and other fields, and continues to be developed towards miniaturization and portability. At present, a fuselage of the multi-rotor UAV is parallel to a horizontal plane when it is in non-taking off (meaning placed on a horizontal table), taking off and landing, or in flight, etc. Multi-rotor UAVs need to take off and land on a level field, and the application scenarios are limited.

SUMMARY

A first aspect of an embodiment of the present application provides an unmanned aerial vehicle (UAV). The UAV may comprise a fuselage; at least two front arms and at least two rear arms, the at least two front arms symmetrically coupled to a front end of the fuselage and the at least two rear arms symmetrically coupled to a rear end of the fuselage; and propellers at ends of the at least two front arms away from the fuselage and at ends of the at least two rear arms away from the fuselage, respectively. An angle between a longitudinal axis of the fuselage and a horizontal plane may be within a first angular range when the unmanned aerial vehicle is in a taking off or landing state, and an angle between the longitudinal axis of the fuselage and the horizontal plane may be within a second angular range when the unmanned aerial vehicle is in a cruise state. A maximum value of the second angular range may be less than a minimum value of the first angular range. In response to the aerial vehicle switching between the takeoff or landing state and the cruise state, the fuselage and the propellers tilt as a whole.

A second aspect of an embodiment of the present application provides an unmanned aerial vehicle (UAV). The unmanned aerial vehicle may comprise a fuselage; two front arms and two rear arms, the two front arms symmetrically connected to a front end of the fuselage and the two rear arms symmetrically connected to a rear end of the fuselage; four propellers at ends of the two front arms away from the fuselage and at ends of the two rear arms away from the fuselage respectively; and four visual sensors at the ends of the two front arms away from the fuselage and at the ends of the two rear arms away from the fuselage respectively. Each pair of shooting angles of the four visual sensors partially overlap and form a binocular vision module so that the four visual sensors form four binocular vision modules.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
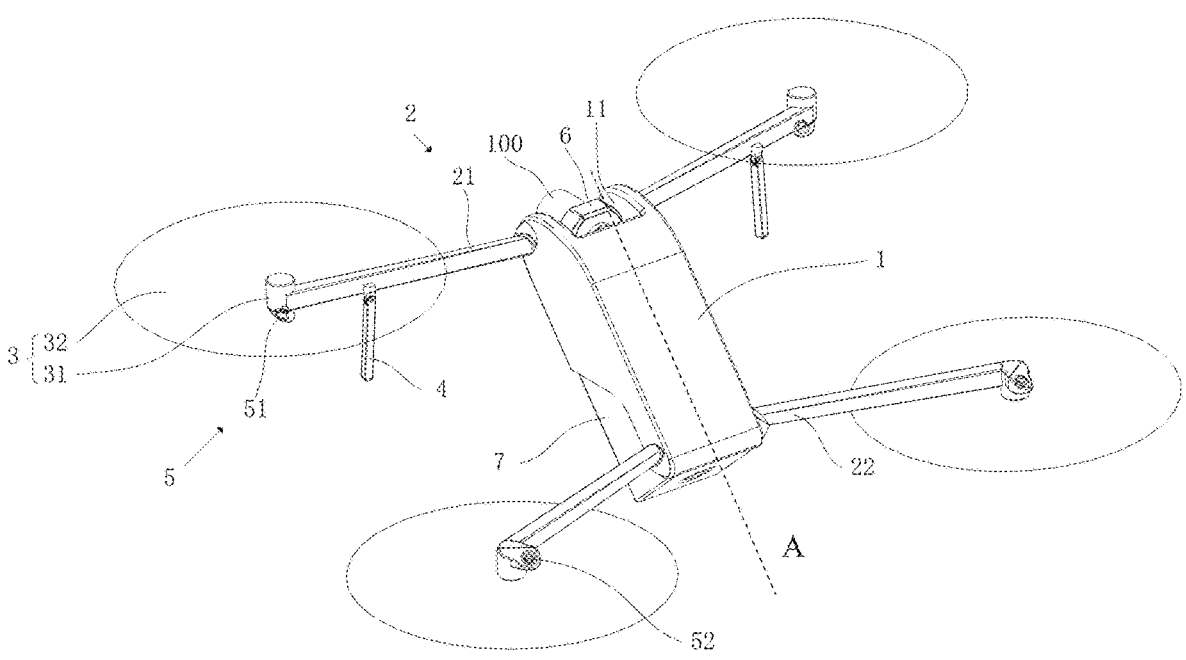
FIG. 1 is a schematic diagram of a structure of an unmanned aerial vehicle of an embodiment of the present application when it is in non-taking off, taking off or landing, with the paddles indicated by circles.

The technical solutions in the embodiments of the present application will be described below in conjunction with the accompanying drawings in the embodiments of the present application. Obviously, the described embodiments are only some of the embodiments of the present application, not all of them. Based on the embodiments in this application, all other embodiments obtained by persons of ordinary skill in the art without making creative efforts belong to the scope of protection of this application.

At present, a fuselage of a multi-rotor UAV is parallel to a horizontal plane when it is in non-taking off (meaning it is placed on a horizontal table), taking off and landing, and in flight, etc. The multi-rotor UAV needs take off and land on a level field, and accordingly the application scenarios are limited.

For an unmanned aerial vehicle according to one embodiment of the present application, an angle between a fuselage of the unmanned aerial vehicle and a horizontal plane when the UAV is in non-taking off, taking off, and landing is greater than that of the unmanned aerial vehicle when the unmanned aerial vehicle flies at a constant speed or cruise, thereby realizing the unmanned aerial vehicle's tilting or vertical placement and tilting or vertical taking off and landing, so that the unmanned aerial vehicle is able to carry out taking off and landing even on an unleveled site, and expanding the unmanned aerial vehicle's application scenarios.

It should be noted that the features in the following embodiments and implementations may be combined with each other if without conflict.

In the present application, "at least one" means one or more, and "more than one" means two or more. The character "and/or" describes an association relationship of the associated objects, indicating that three relationships may exist. For example, A and/or B may indicate: the existence of A alone, the existence of both A and B, and the existence of B alone, wherein A, B may be singular or plural. The character "/" generally indicates that the associated objects are in an "or" relationship. The expression "at least one of the following" or its equivalent refers to any combination of these items, including any combination of singular or plural items. For example, at least one (of) a, b, or c may be expressed as: a, b, c, a and b, a and c, b and c, or a and b and c, where a, b, and c may be single or multiple.

The unmanned aerial vehicle of an embodiment of the present application may be a drone or other type of unmanned aerial vehicle.

In the following, the structure of the unmanned aerial vehicle of an embodiment of the present application is described by means of Example 1 and Example 2.

Example 1

One embodiments of the present application provides an unmanned aerial vehicle, please refer to FIGS. 1 to 5, the unmanned aerial vehicle may comprise a fuselage 1, a plurality of arms 2 attached to the fuselage 1, and propellers 3 attached to ends of the arms 2 away from the fuselage 1. Optionally, the plurality of arms 2 comprises at least two front arms 21 and at least two rear arms 22. The at least two front arms 21 may be symmetrically attached to the front end of the fuselage 1 and the at least two rear arms 22 may be symmetrically connected to the rear end of the fuselage 1. The front arms 21 are provided with propellers 3 at the ends thereof away from the fuselage 1 and the rear arms 22 are provided with propellers 3 at the ends thereof away from the fuselage 1.

Figure 5:
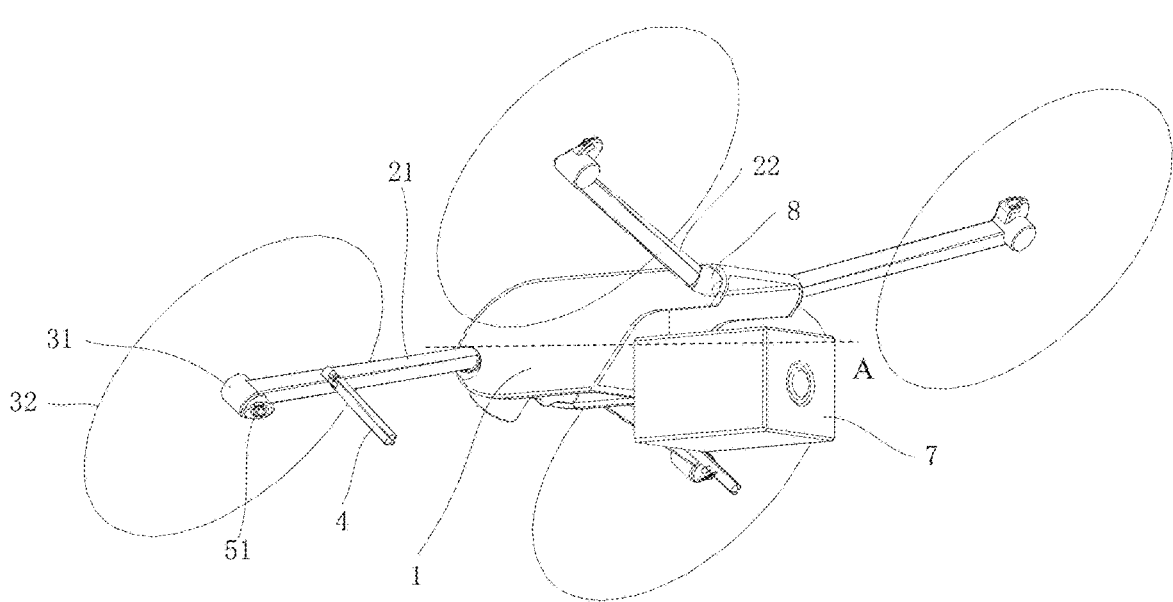
FIG. 5 is a schematic diagram of the structure of the unmanned aerial vehicle of the embodiment described in FIG. 1 when flying at a constant speed or hovering.
Figure 6:
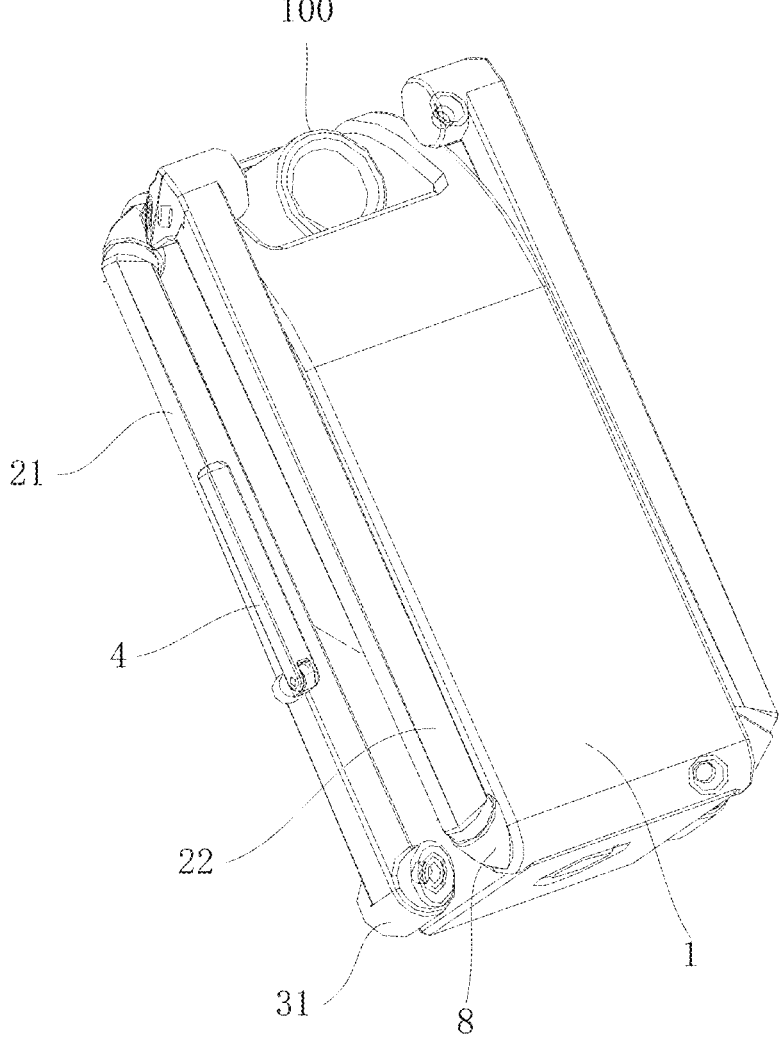
FIG. 6 is a schematic diagram of the structure of the unmanned aerial vehicle of the embodiment described in FIG. 1 in a folded state.
Figure 7:
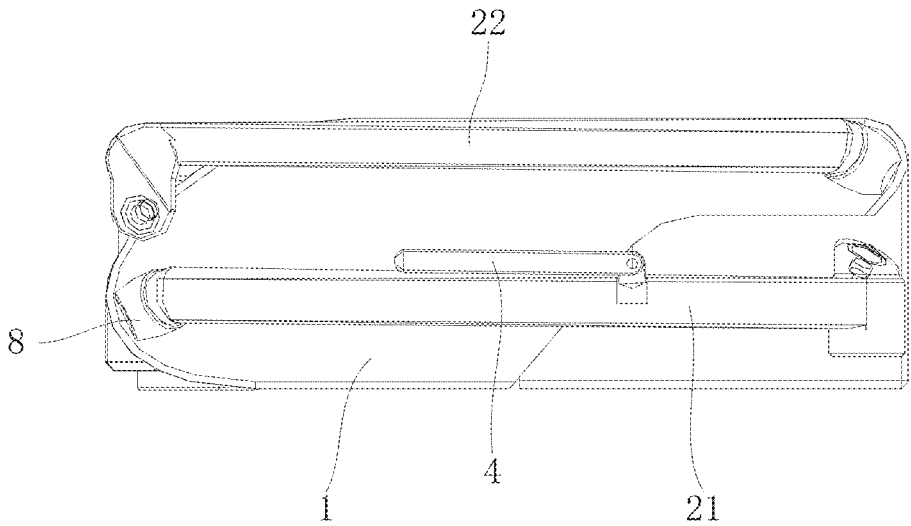
FIG. 7 is a schematic view of the structure of the unmanned aerial vehicle of the embodiment described in FIG. 6 in another direction.
Figure 8:
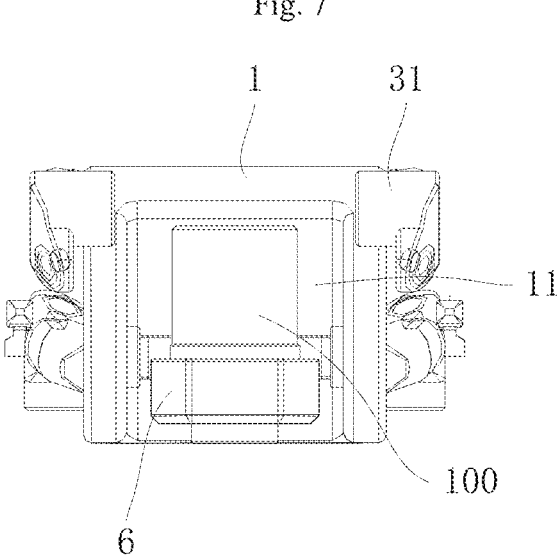
FIG. 8 is a schematic view of the structure of the unmanned aerial vehicle of the embodiment described in FIG. 6 in another direction.
Figure 9:
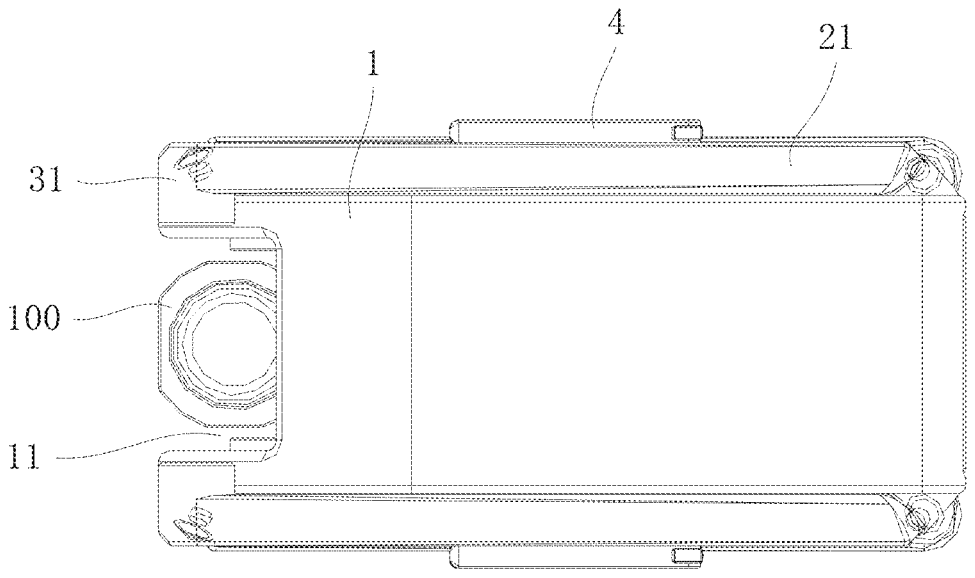
FIG. 9 is a schematic view of the structure of the unmanned aerial vehicle of the embodiment described in FIG. 6 in another direction.

In an embodiment of the present application, when the unmanned aerial vehicle is in non-taking off, taking off and landing (as shown in FIGS. 1 to 4), an angle between a longitudinal axis A the fuselage 1 and a horizontal plane is within a first angular range; when the unmanned aerial vehicle is flying at a constant speed or cruise, as shown in FIG. 5, the angle between the longitudinal axis A of fuselage 1 and the horizontal plane is within a second angular range, and a maximum value of the second angular range is smaller than a minimum value of the first angular range. The non-taking off may include a parked state or a stowed state.

In one embodiment, the first angular range may be [30°, 90°], i.e., when the UAV is in non-taking off, taking off and landing, the angle between the fuselage 1 and the horizontal plane is greater than or equal to 30° and less than or equal to 90°, the UAV may be obliquely or vertically placed, and the UAV may also obliquely or vertically take off and land. Exemplarily, the first angle ranges from [60°,90° ] or [45°, 90° ].

For example, when the UAV is in non-taking off, taking off, and landing, the angle between the fuselage 1 and the horizontal plane is greater than or equal to 80° and less than or equal to 90°, such as the angle between the fuselage 1 and the horizontal plane is 80°, 85°, or 90°, etc., and the UAV may be vertically placed and vertically take off and land; in another example, when the UAV is in non-taking off, taking off, and landing, the angle between the fuselage 1 and the horizontal plane is greater than or equal to 30°, and less than 80°, for example, the angle between the fuselage 1 and the horizontal plane is 30°, 45° or 60°, etc., and the UAV may be placed obliquely and take off and land obliquely.

The second angle range may be [0°, 20° ], i.e., when the UAV is flying at a constant speed and hovering, the angle of the fuselage 1 with the horizontal plane is greater than or equal to 0° and less than or equal to 20°. Exemplarily, the second angle ranges from [0°,10° ] or [0°,5°], where the fuselage 1 is substantially parallel to the horizontal plane when the UAV is flying at a constant speed and hovering.

For example, the unmanned aerial vehicle flies at a constant speed and hovers at an angle of the fuselage 1 with the horizontal plane greater than or equal to 0 degrees and less than or equal to 5°, such as an angle of the fuselage 1 with the horizontal plane of 0°, 1°, 2°, 3°, 4°, or 5°, etc., when the fuselage 1 is substantially parallel to the horizontal plane.

In another embodiment of the present application, when the unmanned aerial vehicle is in non-taking off, taking off from the horizontal plane and landing to the horizontal plane, the front end of the fuselage 1 is higher than the rear end of the fuselage 1 in terms of the horizontal plane; and when the unmanned aerial vehicle is flying at a constant speed and hovering, the front end of the fuselage 1 and the rear end of the fuselage 1 are at approximately the same height. Taking the bottom of the fuselage 1 being completely affixed and placed on the horizontal plane as an example, the front end of the fuselage 1 is at approximately the same height as the rear end of the fuselage 1. When the unmanned aerial vehicle is in non-taking off, taking off from the horizontal plane, and landing to the horizontal plane, the fuselage 1 is oblique or vertical with respect to the horizontal plane, so as to realize the oblique or vertical placement of the unmanned aerial vehicle and the oblique or vertical taking off and landing of the unmanned aerial vehicle; and when the unmanned aerial vehicle flies at a constant speed and hovers, the fuselage 1 is approximately parallel to the horizontal plane.

In one embodiment of the present application, when the unmanned aerial vehicle takes off and lands, the output force of the propeller 3 located in the front arm 21 is greater than that of the propeller 3 located in the rear arm 22, so as to adjust the angle of the fuselage 1 to the point where the front end is higher than the rear end, and then further adjust the output force of the propeller 3 to be approximately equal, so as to maintain the angle between the front end and the rear end of the fuselage 1 to be approximately stable, and ultimately the front end of the fuselage 1 is higher than the rear end of the fuselage 1 when the UAV takes off from the horizontal plane and lands on the horizontal plane. When the unmanned aerial vehicle is flying at a constant speed and hovering, the output force of the propeller 3 located at the front arm 21 is approximately equal to the output force of the propeller 3 located at the rear arm 22, so that the fuselage 1 is approximately parallel to the horizontal plane.

In addition, when the UAV takes off and lands, the propeller 3 located in the front arm 21 provides the pulling force and the propeller 3 located in the rear arm 22 provides the thrusting force.

The number of the front arms 21 and the number of the rear arms 22 may be designed according to the need. Optionally, the numbers of the front arms 21 and the rear arms 22 are equal, exemplarily, each of the number of the front arms 21 and the number of the rear arms 22 is two; of course, the number of the front arms 21 and the number of the rear arms 22 may not be equal.

Referring to FIGS. 1, 2, and 4 to 5, the UAV of an embodiment of the present application may further comprise at least two brackets 4, the at least two brackets 4 being connected in correspondence with the at least two front arms 21. In the embodiment of the present application, the brackets 4 serve as a support for the UAV when the UAV is in non-taking off, taking off and landing, realizing the oblique or vertical placement and taking off and landing of the UAV obliquely or vertically.

In the following, the structure of the unmanned aerial vehicle is specifically described as an example where the number of the front arms 21, the rear arms 22 and the bracket 4 are all two; it will be appreciated that the following embodiments are also applicable where the number of the front arms 21, the rear arms 22 and the bracket 4 are other numbers.

Currently, the landing gear of the unmanned aerial vehicle is attached to an end of the arm away from the fuselage, and the propeller is also attached to an end of the arm away from the fuselage, so that the landing gear is easy to interfere with the propeller. If the landing gear is assembled to the propeller, when the propeller is damaged and replaced, the landing gear is matched to be replaced, which increases the cost. In this regard, in one embodiment of the present application, please refer again to FIGS. 1 and 2 and FIGS. 4 to 5, one end of the bracket 4 is attached to a portion of the front arm 21 located between the propeller 3 and the fuselage 1. In this way, the bracket 4 can be avoided from interfering with the propeller 3, and there is no need to dismantle or replace the bracket 4 when the propeller 3 is replaced.

Optionally, the bracket 4 is connected to a position of the front arm between a middle point of the front arm 21 and the end of the front arm 21 away from the fuselage 1, so setting up that when the UAV is in non-taking off, taking off and landing, the force exerted by the UAV on the support surface rests on the two sides of the fuselage 1 and the rear end of the fuselage 1, and the UAV is placed in a more stable manner. Of course, the bracket 4 may also be attached to a position of the front arm between the middle point of the front arm 21 and the end of the front arm 21 near the fuselage 1.

In one embodiment, referring again to FIGS. 1 to 5, the front arm 21, the rear arm 22 and the bracket 4 of this embodiment of the application are in the shape of a rod. It is to be understood that the front arm 21, the rear arm 22 and the bracket 4 are not limited to a rod shape, but may also be of other shapes, such as a sheet shape.

Optionally, the two front arms 21 are attached to the fuselage 1 at the same height and the two rear arms 22 are attached to the fuselage 1 at the same height. Of course, there may be a small height difference between the two front arms 21 attached to the fuselage 1 and a small height difference between the two rear arms 22 attached to the fuselage 1.

In one embodiment, the position where the rear arm 22 attaches to the fuselage 1 and the position where the front arm 21 attaches to the fuselage 1 may be staggered or different in the height direction of the fuselage 1, or the position where the rear arm 22 attaches to the fuselage 1 may be the same at the height direction as the position where the front arm 21 attaches to the fuselage 1.

Exemplarily, the position where the rear arm 22 attaches to the fuselage 1 and the position where the front arm 21 attaches to the fuselage 1 may be staggered or different in the height direction of the fuselage 1. With such a design, it is possible to make the propeller 3 on the front arm 21 and the propeller 3 on the rear arm 22 staggered from each other in the height direction, so that the propellers 3 are more flexibly deployed. Optionally, please refer to FIG. 5, when the unmanned aerial vehicle is upright and horizontally placed (i.e., the bottom of the fuselage 1 is completely affixed and placed on a horizontal surface), the position where the rear arm 22 attaches to the fuselage 1 is higher than the position where the front arm 21 attaches to the fuselage 1; optionally, the position where the rear arm 22 attaches to the fuselage 1 is lower than the position where the front arm 21 attaches to the fuselage 1.

Referring again to FIGS. 1 to 5, the propeller 3 of one embodiment of the present application may comprise a motor 31 fixed to an end of the corresponding arm 2 away from the fuselage 1 and a paddle 32 disposed at the motor 31, wherein the motor 31 is used to drive the paddle 32 to rotate. The paddle 32 may be a single paddle, a double paddle or otherwise. Alternatively, the paddle 32 may be attached above the motor 31 or below the motor 31. The paddle 32 may be collapsible or non-collapsible, and attached to the motor 31.

Optionally, when the UAV is flying at a constant speed or hovering, the paddle disc formed by the rotation of the paddle 32 is parallel to the horizontal plane, or the angle between the paddle disc formed by the rotation of the paddle 32 and the horizontal plane is located in a third angular range, and the third angular range is [0°,6°], for example, the angle between the paddle disc formed by the rotation of the paddle 32 and the horizontal plane is 0°, 1°, 2°, 3°, 4°, 5°, or 6° and so forth, so as to realize better maneuverability of the UAV.

In one embodiment, the motor 31 may comprise a first motor connected to an end of the front arm 21 away from the fuselage 1 and a second motor connected to an end of the rear arm 22 away from the fuselage 1, and the paddle 32 comprise a first paddle disposed at the first motor and a second paddle disposed at the second motor. Optionally, the first paddle and the second paddle are provided above the corresponding motors 31, or the first paddle and the second paddle are provided below the corresponding motors 31, or the first paddle is provided above the first motor and the second paddle is provided below the second motor, or the first paddle is provided below the first motor and the second paddle is provided above the second motor.

By a certain deployment angle of the arms 2 and the design of the paddles 32, a large headroom of the forward field of view of the UAV can be made possible. Exemplarily, when the unmanned aerial vehicle is flying at a constant speed and hovering, the projections of the paddle disks formed by the rotation of the first paddle and the second paddle located on the same side of the fuselage 1 on the surface parallel to the paddle plane (i.e., the plane where the paddle disks are located) do not overlap. For example, the projections of the paddle disks formed by the rotation of the first paddle and the second paddle located on the left side of the fuselage 1 on the surface parallel to the paddle plane do not overlap, and the projections of the paddle disks formed by the rotation of the first paddle and the second paddle located on the right side of the fuselage 1 on the surface parallel to the paddle plane do not overlap. The projections of the paddle disks formed by the rotation of the first paddle and the second paddle on the surface parallel to the paddle plane do not overlap, so that the paddle disks obscure less the front view field of the UAV, and the field of view of the UAV is large. The first paddle and the second paddle may or may not be staggered in the height direction.

In one embodiment, the plane in which the paddle disk formed by the rotation of the first paddle is located is substantially parallel to the plane in which the paddle disk formed by the rotation of the second paddle is located.

In some embodiments, the sizes of the paddles 32 may be increased. Since the position where the rear arm 22 attaches to the fuselage 1 is higher than the position where the front arm 21 attaches to the fuselage 1, thereby providing space for the design of a larger sizes of the paddle disks, the paddle disks formed by the rotations of the first paddle and the second paddle, which are located on the same side of the fuselage 1, are located in different planes, when the unmanned aerial vehicle is flying at a constant speed or hovering and the projections on the surface parallel to the paddle plane may overlap. Although the paddle disks will block a part of the front field of view of the UAV, the length of the paddles 32 can be designed to be longer, which can improve the endurance of the UAV. In this embodiment, the first paddle and the second paddle are staggered in the height direction to prevent the first paddle and the second paddle located on the same side of the fuselage 1 from colliding during rotation. It is to be noted that the partial overlapping of the projections of the paddle disks formed by the rotation of the first paddle and the second paddle located on the same side of the fuselage 1 on the plane parallel to the paddle plane includes the scenario in which the projections of the paddle disks formed by the rotation of the first paddle and the second paddle located on the same side of the fuselage 1 on the plane parallel to the paddle plane are tangent to each other.

Figure 3:
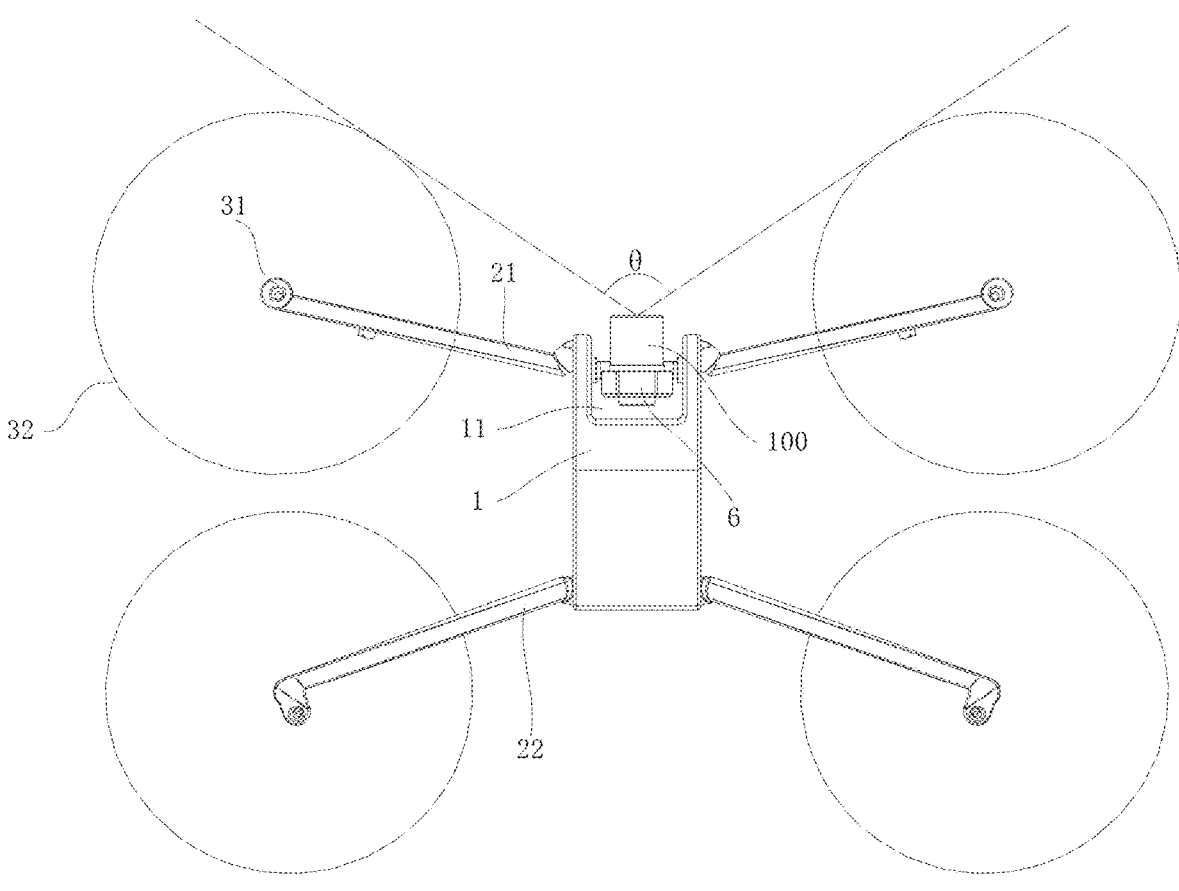
FIG. 3 is a schematic view of the structure of the unmanned aerial vehicle of the embodiment described in FIG. 1 in another direction.
Figure 4:
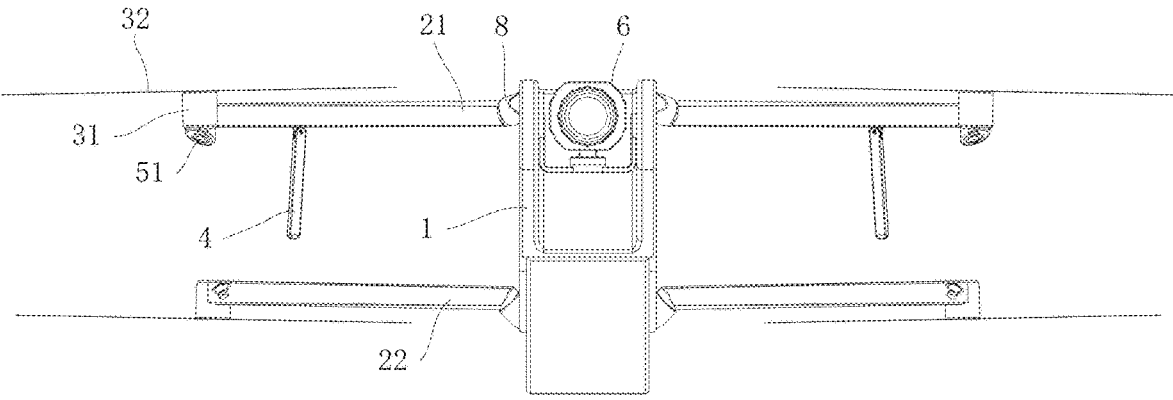
FIG. 4 is a schematic view of the structure of the unmanned aerial vehicle of the embodiment described in FIG. 1 in another direction.

In one embodiment, referring to FIG. 3, the front end of the fuselage 1 is equipped with a shooting device, and the angle θ between two tangent lines from a center of the lens of the shooting device to two tangent points of the paddle discs formed by the rotation of the two first paddles respectively is greater than or equal to 107° and less than or equal to 112°. Exemplarily, the angle between two tangent lines from a center of the lens of the shooting device to two tangent points of the paddle discs formed by the rotation of the two first paddles respectively is 107°, 108°, 109°, 110°, 111°, or 112°, and the like.

Exemplarily, the angle θ between two tangent lines from a center of the lens of the shooting device to two tangent points of the paddle discs formed by the rotation of the two first paddles respectively is 112°, and the camera does not see the paddles 32 even when the shooting device can use a wide-angle lens of an equivalent of 16 mm.

Optionally, the first paddle is mounted above the first motor, and the second paddle is mounted below the second motor, so setting up that the design of the paddles 32 is more flexible. For example, when the UAV is flying at a constant speed or hovering, the projections of the paddle discs formed by the rotation of the first paddle and the second paddle, which are located on the same side of the fuselage 1, on the plane parallel to the paddle plane do not overlap, or partially overlap, which is conducive to the shooting device to capture a UAV panoramic image of the front; and, by mounting the first paddle on the top of the first motor and the second paddle on the bottom of the second motor, the first paddle and the second paddle rotating will not touch the user when the user holds the UAV in hand during taking off and landing of the UAV, which reduces the danger of the user when the user holds the UAV in hand during taking off and landing of the UAV.

In one embodiment, the axial direction of the first motor and the axial direction of the second motor are parallel to each other, or the angle between the axial direction of the first motor and the axial direction of the second motor is in the fourth angular range. Optionally, the fourth angular range is [0°, 5°], for example, the angle between the axial direction of the first motor and the axial direction of the second motor may be 0°, 1°, 2°, 3°, 4°, 5°, and so on, so as to design, and to increase the endurance capacity of the UAV.

Optionally, when the UAV takes off and lands, the axial direction of the first motor and the axial direction of the second motor are both parallel to the vertical direction, which facilitates the oblique or vertical takeoff and landing of the UAV.

In some embodiments, the UAV may be switched between a folded state and an unfolded state.

Exemplarily, the front arm 21 and the rear arm 22 are each rotatably connected to the fuselage 1, and the bracket 4 is rotatably connected to the front arm 21. In this embodiment, the front arm 21 and the rear arm 22 are rotated relative to the fuselage 1, and the bracket 4 is rotated relative to the front arm 21, so as to enable the UAV to be selectively in an unfolded state (as shown in FIGS. 1-5) or a folded state (as shown in FIGS. 6-9). In some embodiments, in the unfolded state, the front arm 21 and the rear arm 22 form an angle with the fuselage 1, respectively, and the bracket 4 forms an angle with the front arm 21; in the folded state, the front arm 21 and the rear arm 22 are affixed to the fuselage 1, and the bracket 4 is affixed to the front arm 21. In the present embodiment, the joints of the arms 2 and the fuselage 1 are located at the front end and the rear end of the fuselage 1, respectively, so that the length of the arms 2 can make full use of the length of the fuselage 1 without increasing the storage volume after folding, and the length of the arms 2 is large in relation to the length of the fuselage 1, and thus a propeller 3 with a larger diameter (i.e., the diameter of the paddle discs) can be used to enhance aerodynamic efficiency and to increase the duration of the endurance time. Furthermore, the folding design of the present embodiment makes the unmanned aerial vehicle have a regular and compact storage effect after folding, with good portability.

In some embodiments, in the unfolded state, the angle formed by the front arm 21 with the fuselage 1 and the angle formed by the rear arm 22 with the fuselage 1 may or may not be equal. Optionally, in the unfolded state, the angle formed by the front arm 21 with the fuselage 1 and the angle formed by the rear arm 22 with the fuselage 1 is greater than or equal to 60° and less than or equal to 120°. The angle formed by the bracket 4 and the front arm 21 may be designed according to the need, exemplarily, the angle formed by the bracket 4 and the front arm 21 is greater than or equal to 90° and is less than 180°, such as the angle formed by the bracket 4 and the front arm 21 is 90°, 120°, or 150°, and so on, so that the bracket 4 is able to form a more stable support when the unmanned aerial vehicle takes off and lands.

In addition, in some embodiments of the present application, the paddle 32 and the motor 31 may be rotatably connected or not rotatably connected. Exemplarily, the paddle 32 and the motor 31 are rotatably connected to enhance the stowage effect.

In the following, the structure of the UAV in the folded state according to some embodiments of the present application is described.

In one embodiment of the present application, the length directions of the fuselage 1, the front arm 21, the rear arm 22 and the bracket 4 are the same, the length direction of the fuselage 1 is parallel to the direction of the line connecting the front end of the fuselage 1 with the rear end of the fuselage 1, and the length direction of each of the front arm 21, the rear arm 22 and the bracket 4 is the direction of their respective extensions. The unmanned aerial vehicle of the present embodiment has a regular and compact stowage effect.

The folding method of the front arm 21 and the rear arm 22 can be designed as desired. Optionally, the front arm 21 is affixed to the side wall of the fuselage 1 on the corresponding side or the front arm 21 is affixed to the bottom of the fuselage 1, and the rear arm 22 is affixed to the side wall of the fuselage 1 on the corresponding side or the rear arm 22 is affixed to the top of the fuselage 1. Exemplarily, the front arm 21 is affixed to the side wall of the fuselage 1 on the corresponding side, the rear arm 22 is also affixed to the side wall of the fuselage 1 on the corresponding side, and the rear arm 22 on the same side is located on top of the front arm 21; in other embodiments, the front arm 21 is affixed to the side wall of the fuselage 1 on the corresponding side, and the rear arm 22 is affixed to the top of the fuselage 1; and in other embodiments, the front arm 21 is affixed to the bottom of the fuselage 1, the rear arm 22 is affixed to the sidewall of the fuselage 1 on the corresponding side; in other embodiments, the front arm 21 is affixed to the bottom of the fuselage 1 and the rear arm 22 is affixed to the top of the fuselage 1.

The folding of the bracket 4 may be designed as desired. For example, in some embodiments, the bracket 4 is located on the same side of the fuselage 1 as the corresponding front arm 21 and the bracket 4 is affixed to the fuselage 1. Optionally, the bracket 4 is located above or below the corresponding side of the front arm 21; optionally, the bracket 4 is located between the fuselage 1 and the front arm 21 of the corresponding side, and the bracket 4 is affixed to the front arm 21 of the corresponding side. In other embodiments, the bracket 4 is affixed to a side of the corresponding front arm 21 away from the fuselage 1.

Optionally, the length of the front arm 21, the length of the rear arm 22 and the length of the fuselage 1 are approximately equal, the length direction of the fuselage 1 is parallel to the direction of the line connecting the front end of the fuselage 1 and the rear end of the fuselage 1, and the length directions of the front arm 21 and the rear arm 22 are respective extension directions. In this embodiment, the connection between the arms 2 and the fuselage 1 is located at the front end and the rear end of the fuselage 1, respectively, so that the length of the arms 2 makes full use of the length of the fuselage 1 without increasing the storage volume after folding, and the length of the arms 2 is large relative to the length of the fuselage 1, so that propellers 3 with a larger diameter (i.e., the diameter of the paddle discs) can be used to enhance the aerodynamic efficiency and to increase the endurance time.

Optionally, the length of the bracket 4 is less than the length of the front arm 21, and the length direction of the bracket 4 is the extension direction thereof, so that the bracket 4 will not protrude relative to the fuselage 1 after folding, and thus the bracket 4 will not increase the volume of the UAV in the length direction after folding, further enabling the UAV to have a well-organized and compact stowage effect.

Optionally, the first paddle and the second paddle are affixed to the fuselage 1, and a surface of the fuselage 1 for affixing the first paddle is mutually perpendicular to a surface of the fuselage 1 for affixing the front arm 21, and a surface of the fuselage 1 for affixing the second paddle is mutually perpendicular to a surface of the fuselage 1 for affixing the rear arm 22. Exemplarily, the front arm 21 is affixed to a side wall of the fuselage 1 on a corresponding side, and the first paddle is affixed to a bottom of the body 1; or, if the front arm 21 is affixed to a bottom of the fuselage 1, the first paddle is affixed to a side wall of the fuselage 1; or, if the rear arm 22 is also affixed to a side wall of the fuselage 1 on a corresponding side, and the second paddle is affixed to a top of the fuselage 1; or, if the rear arm 22 is affixed to a top of the fuselage 1, the second paddle is affixed to a side wall of the fuselage 1. Wherein, when the first paddle and the rear arm 22 are affixed to the side wall of the fuselage 1, the rear arm 22 is located above the first paddle; and when the second paddle and the front arm 21 are affixed to the side wall of the fuselage 1, the second paddle is located above the front arm 21. By means of the above-described folding manner of the arms 2 and the paddles 32, it is ensured that the unmanned aerial vehicle has a regular and compact stowage effect.

Optionally, after folding, the first motor is affixed to the rear end of the fuselage 1 and the second motor is affixed to the front end of the fuselage 1. As the front arm 21 rotates toward the rear end of the fuselage 1 and the rear arm 22 rotates toward the front end of the fuselage 1 when folded, the first motor is affixed to the rear end of the fuselage 1 and the second motor is affixed to the front end of the fuselage 1. With such a design, the unmanned aerial vehicle is more regular and compact after folding.

After folding, the axial direction of the first motor and the axial direction of the second motor may be parallel or perpendicular to the side wall of the fuselage 1 to further improve the regularity and compactness of the UAV after folding. Exemplarily, the axial direction of the first motor is parallel to the side wall of the fuselage 1, and the axial direction of the second motor is parallel to the side wall of the fuselage 1; alternatively, the axial direction of the first motor is parallel to the side wall of the fuselage 1, and the axial direction of the second motor is perpendicular to the side wall of the fuselage 1; alternatively, the axial direction of the first motor is perpendicular to the side wall, and the axial direction of the second motor is perpendicular to the side wall of the fuselage 1.

Optionally, the front arm 21 and the rear arm 22 are rotatably connected to the fuselage 1 via the first rotary axis 8, respectively, so that the front arm 21 and the rear arm 22 can be switched between the folded and unfolded states by rotation. Optionally, the first rotary axis 8 is a spatial rotary axis, and the spatial rotary axis is a rotary axis that can be rotated around a predetermined axis so as to realize flipping in space, the direction of which is determined by the predetermined axis, and the spatial rotary axis rotates more flexibly and conveniently. It should be understood that, in some embodiments of the present application, the direction of rotation of the spatial rotary axis is not parallel to the fuselage, and is not perpendicular to the fuselage. In one embodiment, the first rotary axis 8 is not a spatial rotary axis, i.e., the first rotary axis 8 cannot be rotated around an axis fixed in one direction to realize flipping. Optionally, the front arm 21 is first rotated toward the rear end of the fuselage 1 through the corresponding first rotary axis 8 to the point that one side (the non-main surface) of the front arm 21 is affixed to the fuselage 1. At this point, the non-main surface of the front arm 21 is affixed to the fuselage 1. In order to further enhance the effect of the stowing effect, the front arm is again rotated upwardly or downwardly so that the main surface of the front arm 21 is affixed to the fuselage 1 through the corresponding first rotary axis 8. Here. The front arm 21 is affixed to the fuselage 1 with the greatest degree of affixation, which is conducive to the unmanned aerial vehicle to be more regular and compact after being folded. Optionally, the front arm 21 is rotated toward the rear end of the fuselage 1 through the corresponding first rotary axis 8 to the main surface of the front arm 21 being affixed to the fuselage 1. When the first rotary axis 8 is a spatial rotary axis, the above-described two steps of first rotating the front arm 21 toward the rear end of the fuselage 1 by the corresponding first rotary axis 8 until one side of the front arm 21 is affixed to the fuselage 1, and then rotating the front arm 21 upwardly or downwardly by the corresponding first rotary axis 8 until the main surface of the front arm 21 is affixed to the fuselage 1, can be accomplished by the step of rotating around one predetermined axis only.

It will be appreciated that the rotatable connection between the front arm 21 and the fuselage 1 and between the rear arm 22 and the fuselage 1 may also be realized by other means. The bracket 4 may also be rotatably connected to the front arm 21 via the second rotary axis, such that the bracket 4 may be switched between folded and unfolded states by rotation. Wherein, the second rotary axis may be a spatial rotary axis, and the explanation and illustration of the spatial rotary axis can be found in the description of the corresponding portion of the above embodiments without further elaboration. While in other embodiments, the second rotary axis is not a spatial rotary axis, optionally, the bracket 4 is first rotated toward the front end of the fuselage 1 by the second rotary axis until the non-main surface of the bracket 4 is affixed with the main surface of the front arm 21, and then, for further enhancing the stowage effect, is rotated upwardly or downwardly by the second rotary axis until the main surface of the bracket 4 is affixed with the main surface of the front arm 21. Optionally, the bracket 4 is rotated toward the front end of the fuselage 1 by the second rotary axis until the main surface of the bracket 4 is affixed to the main surface of the front arm 21. When the second rotary axis is a spatial rotary axis, it is possible to achieve the above two steps of rotating the bracket 4 toward the front end of the fuselage by the second rotary axis to the point where the non-main surface of the bracket 4 is affixed to the main surface of the front arm 21, and then rotating upwardly or downwardly by the second rotary axis to the point where the main surface of the bracket 4 is affixed to the main surface of the front arm 21 by the second rotary axis, through only one step of rotating around one of the pre-determined axes.

It will be appreciated that the rotational connection between the bracket 4 and the front arm 21 may also be realized based on other means.

The folding and unfolding of the front arm 21, the rear arm 22 and the bracket 4 may be realized by manual means or by automatic means.

Exemplarily, before using the unmanned aerial vehicle, the front arm 21, the rear arm 22, and the bracket 4 are manually rotated so that the front arm 21, the rear arm 22, and the bracket 4 are all switched from the folded state to the unfolded state; and after the unmanned aerial vehicle has been used, the front arm 21, the rear arm 22, and the bracket 4 are manually rotated so that the front arm 21, the rear arm 22, and the bracket 4 are switched from the unfolded state to the folded state by manually rotating the front arm 21, the rear arm 22 and the bracket 4.

In some embodiments, after pressing the start button of the unmanned aerial vehicle, the unmanned aerial vehicle is started, at which time the motor 31 drives the front arm 21, the rear arm 22 and the bracket 4 to rotate, so that the front arm 21, the rear arm 22 and the bracket 4 are all switched from the folded state to the unfolded state; after pressing the start button again, the unmanned aerial vehicle is turned off, at which time the motor 31 drives the front arm 21, the rear arm 22 and the bracket 4, causing the front arm 21, the rear arm 22, and the bracket 4 to switch from the unfolded state to the folded state.

It is to be noted that the first rotary axis 8 and the second rotary axis described above are provided with cam locking means internally, so that the rotary axis can stay in its unfolded position or folded position.

Whereas in some embodiments, the unmanned aerial vehicle comprises only the unfolded state, in this embodiment, the front arm 21 is selected to be connected to the fuselage 1 as well as the rear arm 22 to the fuselage 1 in a non-rotatable connection, and the bracket 4 can be selected to be rotatably connected to the front arm 21, or not rotatably connected.

It will be appreciated that in the above embodiments, the UAV is in an unfolded state when the UAV is taking off and landing, flying at a constant speed and hovering.

Figure 2:
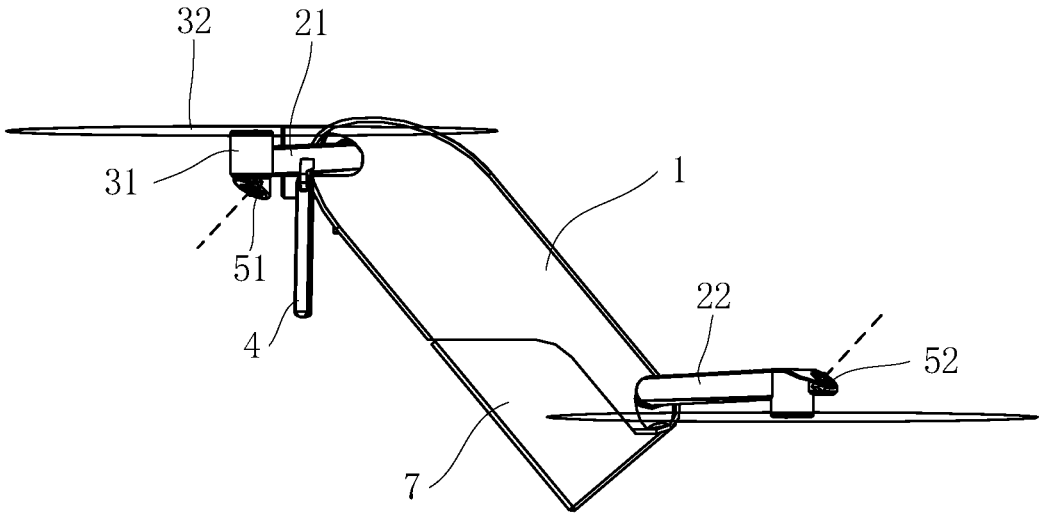
FIG. 2 is a schematic view of the structure of the unmanned aerial vehicle of the embodiment described in FIG. 1 in another direction.

In some embodiments, referring to FIGS. 1 and 2, a visual sensor 5 is provided respectively at one end of each of the front arms 21 away from the fuselage 1 and at one end of each of the rear arms 22 away from the fuselage 1, and the shooting angles of every two of the four visual sensors 5 are partially overlapped, so that every two of the four visual sensors 5 forms a set of binocular vision modules. Based on the simple four visual sensors 5 can constitute a larger range of visual perception system, the cost is lower. Since the visual sensors 5 are provided at the end of the corresponding arm 2 away from the fuselage 1, the visual sensors 5 are not easily blocked by the arm 2, the fuselage 1 and so on.

Optionally, the shooting area covered by each set of binocular vision modules is different or at least partially different.

Optionally, the shooting area covered by the four sets of binocular vision modules is spherical, and the UAV can be made to support omnidirectional sensing based on the simple four vision sensors 5, which is simple in structure and low in cost. The shooting area covered by the four sets of binocular vision modules may also not be spherical.

The vision sensor 5 of the embodiments of the present application may be a fisheye camera or another type of shooting device.

In one embodiment of the present application, the vision sensor 5 is obliquely mounted on the corresponding arm 2 so that the optical axis of the vision sensor 5 is oblique relative to the axial direction of the motor 31 on the corresponding arm 2. Placed obliquely, the vision sensor 5 has a wider field of view of the shooting, which is conducive to the realization of omnidirectional sensing of the unmanned aerial vehicle.

Optionally, the vision sensor 5 is obliquely mounted at an end of the corresponding arm 2 away from the fuselage 1, and the fuselage 1 does not obscure the vision sensor 5. Of course, the vision sensor 5 may also be obliquely mounted at other positions of the corresponding arm 2.

Optionally, in some embodiments, the motor 31 is mounted at an end of the corresponding arm 2 away from the body 1, and the visual sensor 5 is mounted on the motor 31 of the corresponding arm 2 at an angle, so that the visual sensor 5 does not interfere with the mounting of the motor 31, and the visual sensor 5 has a wider field of view. Optionally, the visual sensor 5 and the paddle 32 are mounted on opposite sides of the motor 31, and the paddle 32 will not block the field of view of the visual sensor 5; of course, the visual sensor 5 and the paddles 32 may also be mounted on the same side of the motor 31, such as the visual sensor 5 and the paddle 32 are both mounted below or above the motor 31.

In other embodiments, the motor 31 is mounted at an end of the corresponding arm 2 away from the fuselage 1, the vision sensor 5 is obliquely mounted at an end of the corresponding arm 2 away from the body 1, and the vision sensor 5 need not be mounted to the motor 31 of the corresponding arm 2.

In some embodiments, the vision sensor 5 may include a first vision sensor 51 disposed at an end of each of the front arms 21 away from the fuselage 1 and a second vision sensor 52 disposed at an end of each of the rear arms 22 away from the fuselage 1, i.e., the vision sensor 5 includes two first vision sensors 51 and two second vision sensors 52.

Optionally, the shooting direction of the first visual sensor 51 is toward the front of the fuselage 1, the shooting direction of the second visual sensor 52 is toward the rear of the fuselage 1, and the two first visual sensors 51 may be shot toward the left front bottom and the right front bottom of the fuselage 1, respectively, and the two second visual sensors 52 may be shot toward the left rear top and the right rear top of the fuselage 1, respectively, to realize omnidirectional sensing.

Optionally, the first vision sensor 51 is disposed below an end of the front arm 21 away from the fuselage 1, and the second vision sensor 52 is disposed above an end of the rear arm 22 away from the fuselage 1. Exemplarily, the first vision sensor 51 is disposed below the first motor at a corresponding end, so as to be staggered from the first paddle above the corresponding first motor; and also exemplarily, the second vision sensor 52 is disposed above the second motor at a corresponding end, so as to be staggered with the second paddle below the corresponding second motor.

Optionally, the two first vision sensors 51 are symmetrically provided, and the two second vision sensors 52 are symmetrically provided, and the symmetrical provision is conducive to forming a binocular vision module. Of course, the two first vision sensors 51 may not be symmetrically provided, and the two second vision sensors 52 may not be symmetrically provided.

In some embodiments, referring to FIG. 1, the unmanned aerial vehicle of an embodiment of the present application may further comprise a gimbal 6 secured to the fuselage 1, the gimbal 6 being used to carry a first load, the first load comprising at least a shooting device, and the first load may further comprise a load such as a launching device, a ranging device, and the like.

Figure 10:
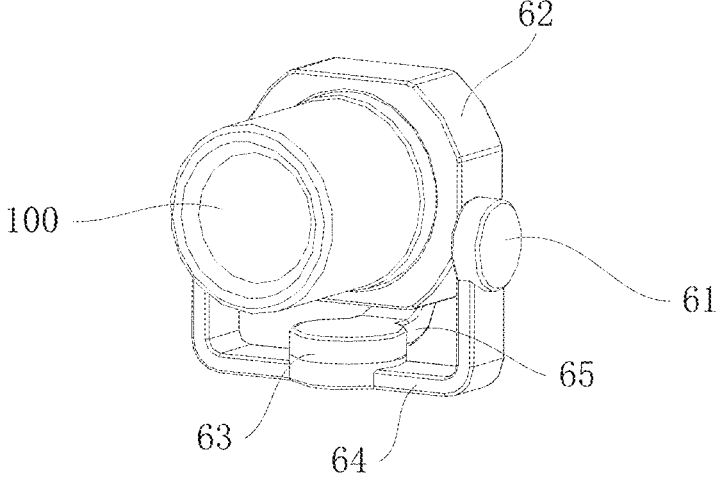
FIG. 10 is a schematic diagram of a structure of a gimbal in an embodiment of the present application.
Figure 11:
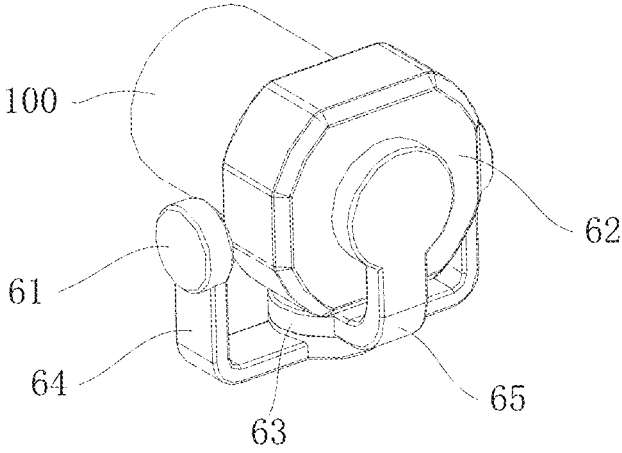
FIG. 11 is a schematic view of the structure of the gimbal of the embodiment described in FIG. 10 in another direction.

The structure of the gimbal 6 can be designed according to the needs, please refer to FIG. 10 and FIG. 11, the gimbal 6 of one embodiment of the present application comprises a first gimbal motor 61 rotating around the pitching direction, the motor housing of the first gimbal motor 61 is fixedly connected to the fuselage 1, and the rotor of the first gimbal motor 61 is used to fix the first load. The gimbal 6 can reach a shooting angle of ±90° in the pitching direction, so that the shooting device can not only shoot the lower hemispherical space area of the unmanned aerial vehicle in the downward direction, but also shoot the upper hemispherical space area of the unmanned aerial vehicle in the upward direction, such as shooting the woods and skyscrapers in the upward direction, so as to expand aerial photography scenes and realize large-angle upward shooting, with a strong degree of flexibility in shooting. This can solve the problem that the existing shooting device has a limited angle in the pitching direction, which makes it impossible to realize large-angle upward shooting, i.e., it is difficult to shoot in the direction of the upper hemisphere, and the shooting flexibility is limited; moreover, when the UAV carries out a large attitude or a high-speed flight, the fuselage 1 will be greatly tilted forward (downward), and the field of view of the shooting device will not be affected at this time due to the fact that the gimbal 6 will not be obstructed under the state of tilting.

In some embodiments, referring again to FIGS. 10 and 11, the gimbal 6 of one embodiment of the present application may further comprise a second gimbal motor 62 rotating around the direction of the roll direction, the second gimbal motor 62 being used to relay the rotor of the first gimbal motor 61 and the first load. The motor housing of the second gimbal motor 62 is fixedly connected to the rotor of the first gimbal motor 61, and the rotor of the second gimbal motor 62 is used to hold the first load. In the embodiment of this application, the first gimbal motor 61 rotates to drive the second gimbal motor 62 and the first load to rotate around the pitching direction, and the second gimbal motor 62 rotates to drive the first load to rotate around the roll direction. By setting the shooting device directly connected to the second gimbal motor 62 (i.e., the horizontal roll axis), the shooting device can be made to switch in the horizontal/vertical shooting state, and can also shoot creative shots of the screen rolling, which can make the shooting device perform native vertical shooting.

In some embodiments, referring again to FIGS. 10 and 11, the gimbal 6 of this embodiment of the application may further comprise a third gimbal motor 63 rotating in a yaw direction, the third gimbal motor 63 being used to adapt the rotor of the first gimbal motor 61 and the motor housing of the second gimbal motor 62, the motor housing of the third gimbal motor 63 being fixedly coupled to the rotor of the first gimbal motor 61, the rotor of the third gimbal motor 63 being fixedly coupled to the motor housing of the second gimbal motor 62, and the third gimbal motor 63 being fixedly coupled to the motor housing of the second gimbal motor 62. In one embodiment of the present application, the first gimbal motor 61 rotates to drive the second gimbal motor 62, the third gimbal motor 63, and the first load to rotate around the pitch direction; the third gimbal motor 63 rotates to drive the second gimbal motor 62 and the first load to rotate around the yaw direction, and the second gimbal motor 62 rotates to drive the first load to rotate around the roll direction, and in this manner, the gimbal of the PYR configuration is constituted so as to make the clear field of view of the shooting device large.

The gimbal 6 of this embodiment may further comprise a first shaft arm 64 for adapting the rotor of the first gimbal motor 61 and the motor housing of the third gimbal motor 63 and a third shaft arm for adapting the rotor of the third gimbal motor 63 and the motor housing of the second gimbal motor 62.

The number of the first gimbal motors 61 may be one or two. Exemplarily, the first gimbal motor 61 includes two, the first shaft arm 64 is U-shaped, and the two first gimbal motors 61 are fixed to the two ends of the first shaft arm 64, and the gimbal 6 is connected to the fuselage 1 through the motor housings of the two first gimbal motors 61, which is more solid. Of course, the first shaft arm 64 may also be of other shapes.

Optionally, the motor housing of the third gimbal motor 63 is socketed at the bottom of the U-shaped first shaft arm 64; the third gimbal motor 63 may also be secured to the bottom of the U-shaped first shaft arm 64 by other means, such as by means of a snap fit, a threaded connection, and the like.

In other embodiments, the attitude change in the yaw direction of the shooting device may be realized by controlling the yaw attitude of the fuselage 1 such that the gimbal 6 may comprise a first gimbal motor 61 and a second gimbal motor 62 without comprising a third gimbal motor 63.

In some embodiments, referring to FIGS. 1 and 3, one end of the front end of the fuselage 1 is provided with a U-shaped recess 11, the motor housings of the two first gimbal motors 31 are fixed to the two sidewalls of the U-shaped recess 11, and the gimbal 6 is stowed in the U-shaped recess 11, and the gimbal 6 is stored by the U-shaped recess 11, so that the structural layout of the unmanned aerial vehicle is more compact.

When the unmanned aerial vehicle of one embodiment of the present application is folded, the lens of the shooting device can be controlled by the gimbal 6 to be directed towards the bottom of the U-shaped recess 11, thereby forming an effective protection for the shooting device through the U-shaped recess 11.

In some embodiments, referring to FIGS. 1 to 2 and FIG. 5, the unmanned aerial vehicle of an embodiment of the present application may further comprise a battery 7, which is used to power the unmanned aerial vehicle. Optionally, the rear end of the fuselage 1 is provided with a slot 12, the battery 7 is disposed in the slot 12, a portion of the battery 7 is exposed, the front upper portion of the battery 7 is buried in the fuselage 1, and the rest of the battery is exposed, and the semi-buried battery 7 reduces the weight of the structure of the fuselage 1.

Of course, in some embodiments, the battery 7 may also be fully buried, i.e., the battery 7 is stowed within the fuselage 1.

The battery 7 of one embodiment of this application may be a rechargeable battery or a disposable battery.

One embodiment of the present application also provides an unmanned aerial vehicle, which may include a fuselage 1, two front arms 21 and two rear arms 22, and the two front arms 21 are symmetrically connected to the fuselage 1, the two rear arms 22 are symmetrically connected to the rear end of the fuselage 1, and the end of the front arm 21 away from the fuselage 1 and the end of the rear arm 22 away from the fuselage 1 are respectively provided with a propeller 3. An end of the front arm 21 away from the fuselage 1 and an end of the rear arm 22 away from the fuselage 1 are respectively provided with visual sensors 5, and the each pair of shooting angles of the four visual sensors 5 partially overlap, so that each pair of the four visual sensors 5 form a binocular vision module.

Reference may be made to the description of the corresponding portions of the above embodiments without further elaboration.

Example 2

The UAV shown in FIGS. 1 to 5 uses a multi-rotor arm, and during the UAV flight (level flight or hovering), the arm 2 and the bracket 4 do not provide lift to the fuselage 1. Unlike Example 1, the UAV shown in FIGS. 12 to 16 is a fixed-wing wing and quadrotor arm 2 synthesized into an integrated multiplexed unit, and during the UAV flight, the arm 2 and the bracket 4 may provide lift to the fuselage 1.

In the following, portions of the unmanned aerial vehicle shown in FIGS. 12 through 16 are described.

Generally speaking, VTOL (Vertical Take-Off and Landing) in the field of unmanned aerial vehicles (UAVs) specifically refers to fixed-wing UAVs with vertical take-off and landing capabilities. Fixed-wing UAVs can realize VTOL in a variety of ways, which can be broadly categorized into two categories: tilt thrust and additional thrusters.

The tilt thrust may be achieved by additional mechanical structures and drive mechanisms to achieve propeller tilting, such as using a mechanical servo to tilt the thrust orientation of the UAV between the vertical direction and the horizontal direction so as to achieve vertical takeoff and landing and horizontal flight. The additional mechanical structures and drive mechanisms are additional loads for the UAV, which can weaken the range level and increase the mechanical complexity.

Additional thrusters utilize more than two sets of propellers, which are responsible for providing the thrust required for flight during the vertical take-off and landing phase and the horizontal flight phase, respectively. For example, in quadrotor UAVs, the total thrust-to-weight ratio of the propellers is generally greater than 2, but the overall power efficiency is low, and thus the endurance time and range are both short. In particular, the vertical propellers are extra loads during horizontal flight, and the horizontal propellers are extra loads during vertical takeoff and landing and hovering; and the fixed-wing wings are generally extra loads for vertical takeoff and landing and hovering, which all reduce the range level.

For this, the vertical take-off and landing fixed-wing unmanned aerial vehicle of one embodiment of the present application is continuously powered by a propeller during take-off, landing and forward flight, without the need to add additional mechanical structures, drive mechanisms. As such, the vertical take-off and landing fixed-wing unmanned aerial vehicle has the advantages of vertical take-off and landing, stable hovering, high power efficiency, long endurance and long range.

The unmanned aerial vehicle of Example 2 may be referred to as a vertical take-off and landing fixed-wing unmanned aerial vehicle, and it will be appreciated that the vertical take-off and landing fixed-wing unmanned aerial vehicle of Example 2 of the present application is essentially a multi-rotor unmanned aerial vehicle.

In some embodiments, referring to FIGS. 12 to 16, the vertical take-off and landing fixed-wing UAV of Embodiment 2 of the present application may include a fuselage 1, a plurality of arms 2 attached to the fuselage 1, and propellers 3 attached to one end of each arm 2 away from the fuselage 1. In one embodiment of the present application, the propellers 3 are used to continuously power the take-off, landing, and forward flight of the vertical take-off and landing of the fixed-wing UAV. When the multi-rotor UAV of Embodiment 2 of the present application performs flight in a fixed-wing mode, it does not rely on movable airfoils such as flaps and tails, etc., which are traditionally present in fixed-wing vehicles for flight control, but instead relies on adjusting the thrust of the plurality of propellers to perform flight control. In some embodiments of the present application, the vertical take-off and landing fixed-wing unmanned aerial vehicle adopts a flight control method similar to the basic control method of existing multi-rotor unmanned aerial vehicles, and will not be repeated.

In one embodiment of the present application, the power provided by the propeller 3 when it is in the take-off state is greater than the power provided by the propeller 3 when it is in the forward-flying state (or the hovering state), and the power provided by the propeller 3 when it is in the landing state is greater than the power provided by the propeller 3 when it is in the forward-flying state (or the hovering state), so that the endurance of the forward-flying of the vertical take-off and landing fixed-wing unmanned aerial vehicle is long. Optionally, the power provided by the propeller 3 when it is in the take-off state is slightly larger than the power provided by the propeller 3 when it is in the landing state, so as to meet the flight requirements.

Figure 16:
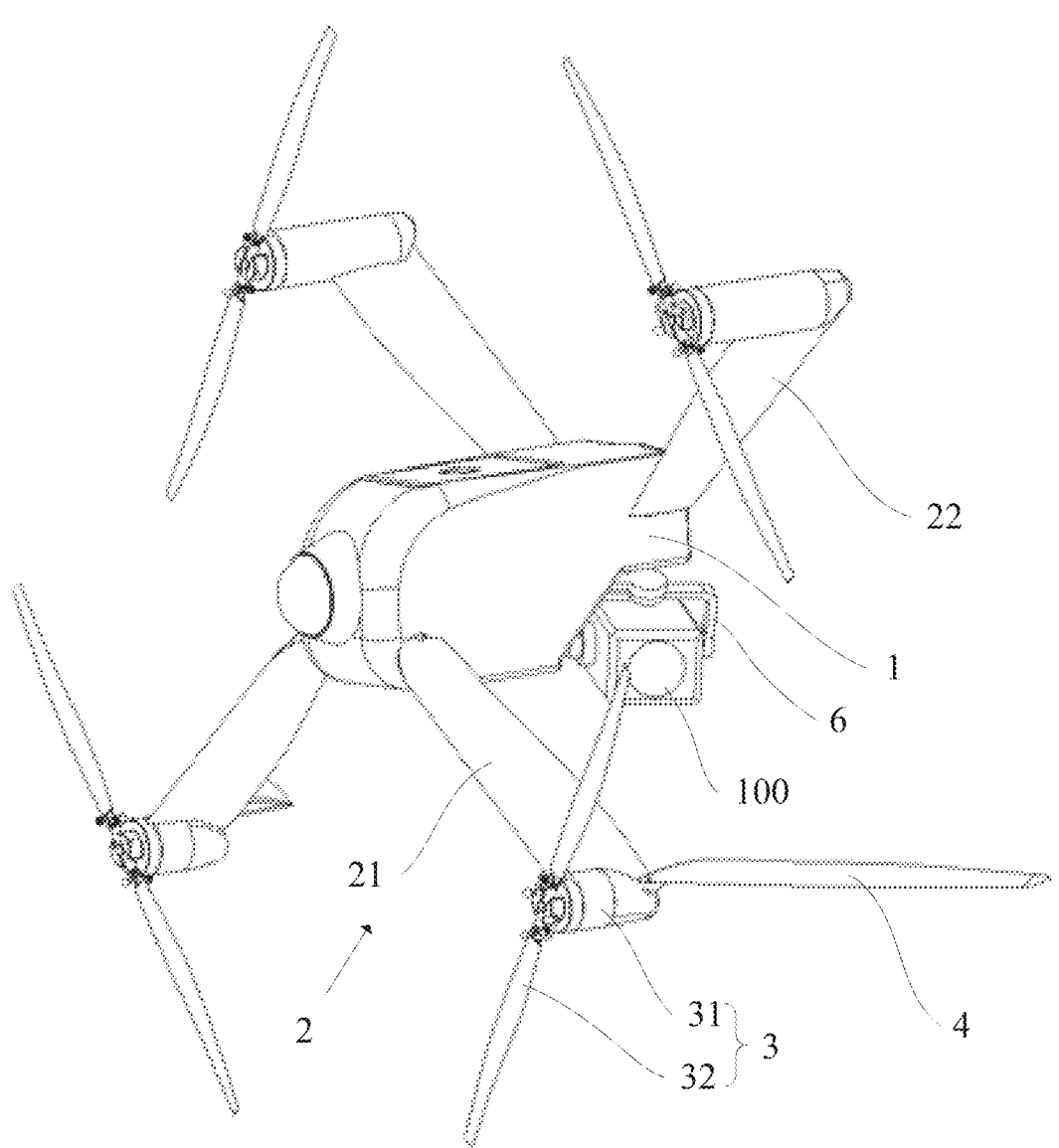
FIG. 16 is a schematic diagram of the structure of the unmanned aerial vehicle of the embodiment described in FIG. 12 during flight forward.
Figure 17:
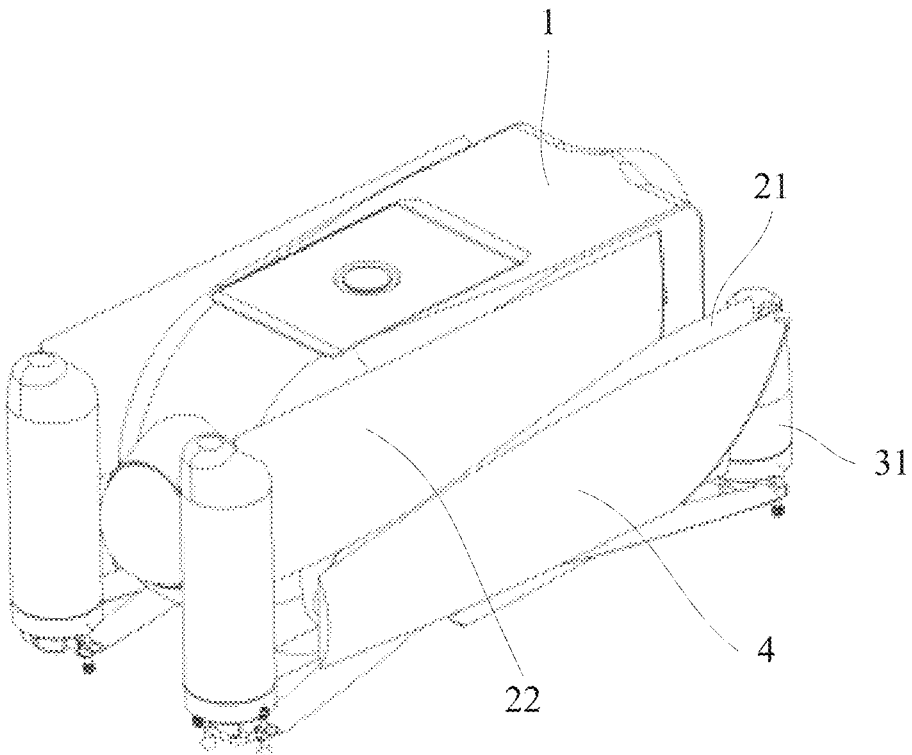
FIG. 17 is a schematic diagram of the structure of the unmanned aerial vehicle of the embodiment described in FIG. 12 in a folded state.
Figure 18:
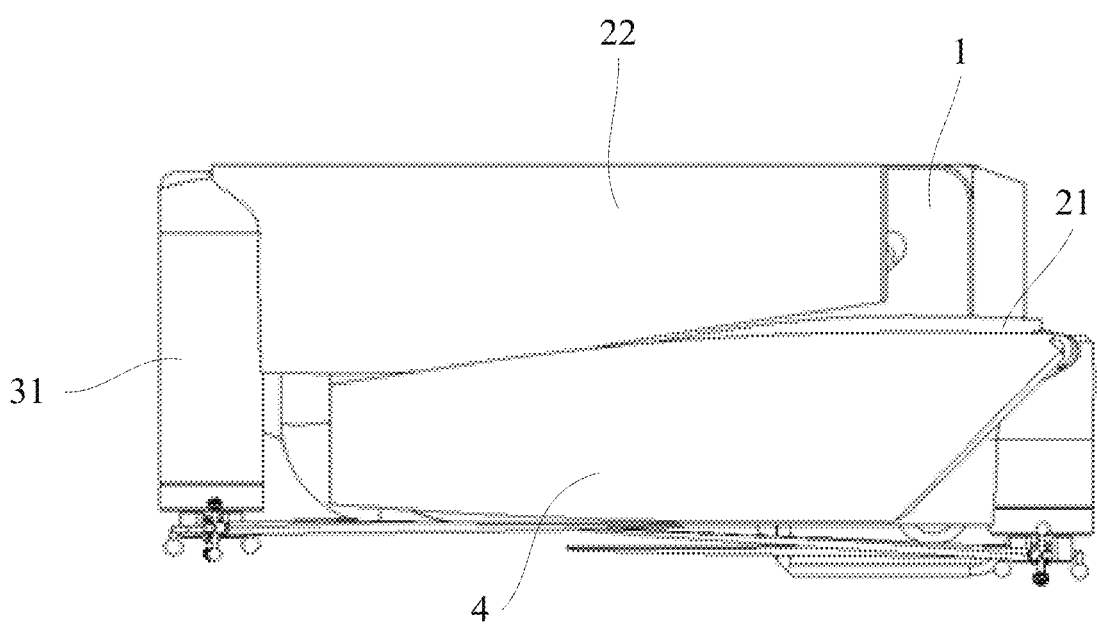
FIG. 18 is a schematic view of the structure of the unmanned aerial vehicle of the embodiment described in FIG. 17 in another direction.
Figure 19:
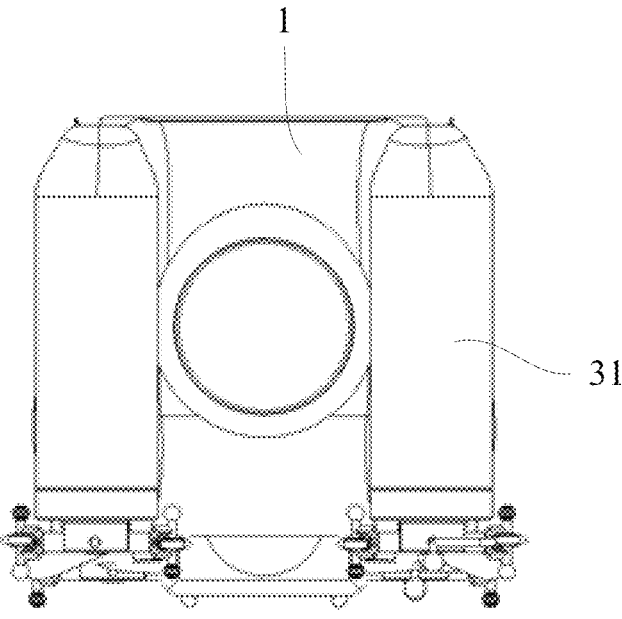
FIG. 19 is a schematic view of the structure of the unmanned aerial vehicle of the embodiment described in FIG. 17 in another direction.
Figure 20:
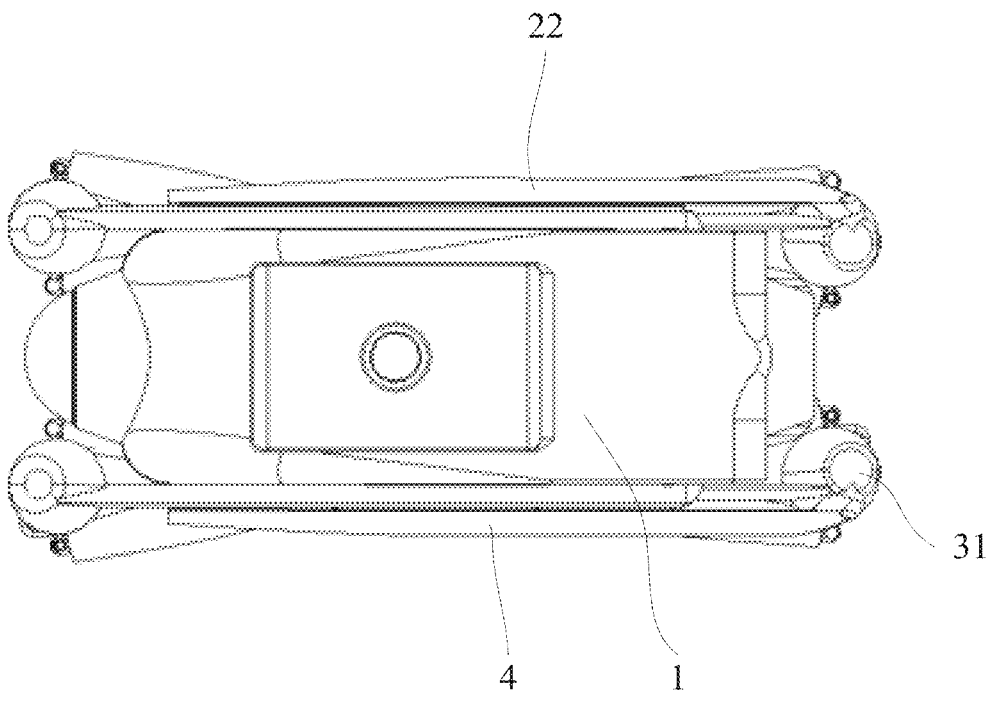
FIG. 20 is a schematic view of the structure of the unmanned aerial vehicle of the embodiment described in FIG. 17 in another direction.

Vertical takeoff and landing fixed-wing UAVs flying in the unfolded state have two states of vertical flight (as shown in FIGS. 12-15) and horizontal flight (i.e., fixed-wing flight, as shown in FIG. 16). Vertical takeoff and landing fixed-wing UAVs firstly take off and land vertically and hover, then accelerate their flight towards the front, and in the process of acceleration, the fuselage 1 is gradually tilted and transitions to the fixed-wing flight state. Horizontal flight may include flight states such as forward flight and hovering.

Example 2 of the present application switches to horizontal flight by tilting the fuselage 1 and the propellers as a whole, and the plurality of arms 2 of the multi-rotor unmanned aerial vehicle can act as the wings of the vertical take-off and landing fixed-wing unmanned aerial vehicle through a certain design, so that the switching between the horizontal flight and the vertical flight does not require an additional mechanical drive mechanism, and the vertical take-off and landing fixed-wing unmanned aerial vehicle has a simple mechanical structure and is of a light weight.

Example 2 of the present application combines a multi-rotor UAV with a fixed-wing UAV by integrating fixed-wing wings and multi-rotor arms in an integrated and multipurpose manner, constituting a VTOL-configuration UAV, which does not require the addition of additional mechanical structures and drive mechanisms, and which can give full play to the respective advantages of the multi-rotor UAV and the fixed-wing UAV, including vertical takeoff and landing, stable hovering, high power efficiency, long endurance, and long range.

In the following, the structure of a vertical take-off and landing fixed-wing unmanned aerial vehicle is described.

Unlike the rod-shaped arm 2 in the above-described embodiment one, the arm 2 of embodiment two of the present application is in the shape of a first wing, see FIGS. 12, 13, and FIGS. 15-16, and the first wing is in the shape of a sheet. In embodiment two of the present application, the arm 2 is used to provide lift to the fuselage 1 when the vertical take-off and landing fixed-wing unmanned aerial vehicle is flying forward.

In one embodiment, the first wing includes a first surface and a second surface disposed opposite to each other. Optionally, the first surface is a curved surface and the second surface is a flat surface. When the vertical take-off and landing fixed-wing unmanned aerial vehicle is flying forward, the first surface is facing upward and the second surface is facing downward, and by such a design, the arm 2 is able to provide a greater lift for the vertical take-off and landing fixed-wing unmanned aerial vehicle flying forward to enhance the endurance of the vertical take-off and landing fixed-wing unmanned aerial vehicle. Optionally, the first surface and the second surface are curved surfaces. The curved surface design enables the arm 2 to provide greater lift for the forward flight of the vertical take-off and landing fixed-wing UAV.

Optionally, the width of the first wing gradually increases in the direction from the end near the fuselage 1 to the direction away from the end of the fuselage 1. With such a design, the arm 2 is able to provide greater lift for the forward flight of the vertical take-off and landing fixed-wing unmanned aerial vehicle, and to enhance the endurance of the vertical take-off and landing fixed-wing unmanned aerial vehicle.

When the vertical take-off and landing fixed-wing unmanned aerial vehicle flies forward or hovers, the angle between the fuselage 1 and the horizontal plane is within a second angle, at which time the fuselage 1 can be considered to be substantially parallel to the horizontal plane, for example, if the angle between the fuselage 1 and the horizontal plane is less than the first predetermined angle. Wherein, the first predetermined angle may be 20°, 10° or 5° or other angle values greater than 0° and less than or equal to 20°. Alternatively, the vertical take-off and landing fixed-wing UAV has the fuselage 1 tilted or vertical with respect to the horizontal plane during take-off and landing.

Exemplarily, see FIGS. 12 through 15, where the fuselage 1 is vertical with respect to the horizontal plane during takeoff and landing of the vertical takeoff and landing fixed wing UAV, and see FIG. 16, where the fuselage 1 is substantially parallel to the horizontal plane when the vertical takeoff and landing fixed wing UAV is flying forward and hovering.

In the following, the structure of the vertical take-off and landing fixed-wing unmanned aerial vehicle is illustrated as an example with the number of the front arms 21 and the rear arms 22 being two, respectively.

In one embodiment of the present application, the two front arms 21 and the two rear arms 22 are crossed two by two so that the two front arms 21 and the two rear arms 22 form an X-shaped fixed wing to provide lift for the vertical take-off and landing fixed-wing UAV in forward flight. To ensure smooth and level flight of the airframe 1, optionally, when the vertical take-off and landing fixed-wing UAV is in forward flight or hovering, the front arms 21 are tilted downward and the rear arms 22 are tilted upward; optionally, when the vertical take-off and landing fixed-wing UAV is in forward flight or hovering, the front arms 21 are tilted upward and the rear arms 22 are tilted downward.

In some embodiments, unlike the rod-shaped bracket 4 in the above-described embodiment one, the bracket 4 of Example 2 of the present application is in the shape of a second wing, please refer to FIGS. 12 to 16 again, and the second wing is a sheet-like structure. When the vertical take-off and landing fixed-wing UAV is in flight, the bracket 4 is used to provide lift for the fuselage 1 to enhance the endurance of the vertical take-off and landing fixed-wing UAV; at the same time, the bracket 4 serves as a landing bracket 4 during the take-off and landing of the vertical take-off and landing fixed-wing UAV.

The second wing may include a third surface and a fourth surface disposed opposite each other, in some embodiments, at least one of the third surface and the fourth surface is a curved surface, e.g., the third surface is a curved surface and the fourth surface is a planar surface; or the third surface is a planar surface and the fourth surface is a curved surface; or both of the third surface and the fourth surface are curved surfaces, the curved surfaces are designed so that the bracket 4 provides greater lift for the vertical takeoff and landing of a fixed-winged unmanned aerial vehicle flying forward; in other embodiments, both the third surface and fourth surface are planar surfaces. The curved surface design enables the bracket 4 to provide greater lift for forward flight of the vertical take-off and landing fixed-wing UAV; in other embodiments, the third surface and the fourth surface are both planar surfaces.

Optionally, the second wing includes a connecting end, the connecting end is connected to an end of the front arm 21 away from the fuselage 1, the connecting end is curved towards the side of the front arm 21, and the width of the connecting end is gradually increased in the direction from the end close to the front arm 21 to the end away from the front arm 21, and so designed, the bracket 4 is able to provide a greater lifting force for the forward flight of the vertically take-off and landing fixed wing UAV.

Optionally, when the vertical take-off and landing fixed-wing UAV flies forward, the angle between the bracket 4 and the horizontal plane is less than a second predetermined angle threshold, and the second predetermined angle threshold may be designed according to a need, for example, the second predetermined angle is 10° or 5°, etc. Exemplarily, when the vertical take-off and landing fixed-wing UAV flies forward, the bracket 4 is substantially parallel to the horizontal plane. When the vertical take-off and landing fixed-wing UAV flies forward, the angle between the bracket 4 and the horizontal plane is smaller, so that the bracket 4 can provide greater lift for the forward flight of the vertical take-off and landing fixed-wing UAV.

In some embodiments, unlike the above Example I where one end of the bracket 4 is attached to a portion of the front arm 21 located between the propeller 3 and the fuselage 1, in Example 2, one end of the bracket 4 may be attached to the end of the front arm 21 away from the fuselage 1, to provide greater lift for the forward flight of a vertically take-off and landing fixed-wing unmanned aerial vehicle.

Optionally, the bracket 4 is attached to the side of the corresponding end of the motor 31 away from the front of the fuselage 1; the bracket 4 may also not be attached to the motor 31, but instead is directly attached to the corresponding end of the front arm 21 away from the fuselage 1.

Optionally, the angle between the extension direction of the bracket 4 and the extension direction of the corresponding front arm 21 is an obtuse angle to provide greater lift for forward flight of the vertical take-off and landing fixed-wing UAV. For example, the angle between the extension direction of the bracket 4 and the extension direction of the corresponding front arm 21 is 120° or other obtuse angle size.

Figure 12:
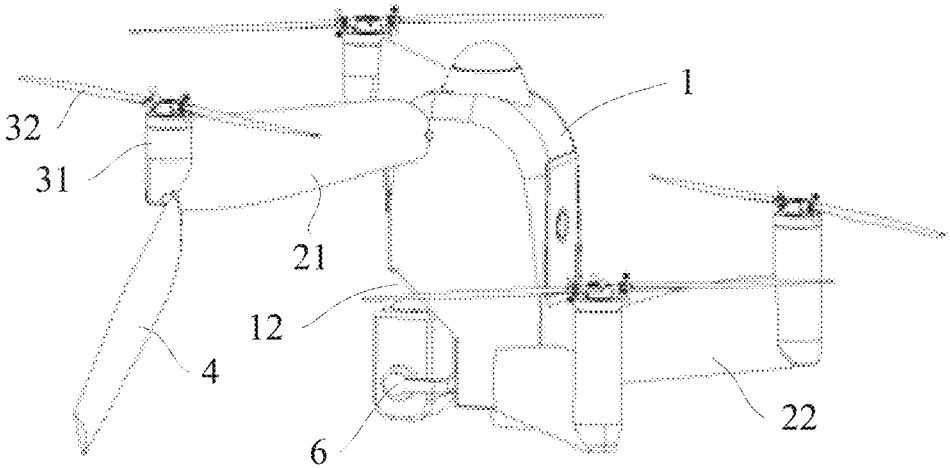
FIG. 12 is a schematic diagram of the structure of an unmanned aerial vehicle in an embodiment of the present application during takeoff or landing.

In one embodiment, unlike the above-described Example 1 in which the gimbal 6 is mounted on the front end of the fuselage 1, in Example 2 of the present application, please refer to FIG. 12, the rear end of the fuselage 1 is provided with a slot 12, and the motor housings of the two first gimbal motors 31 are fixed to the two sidewalls of the slot 12 respectively, and the gimbal 6 is stowed in the slot 12. For example, described in terms of a horizontal flight state, the gimbal 6 is arranged below the rear end of the vertical take-off and landing fixed-wing unmanned aerial vehicle, and the advantage of such an arrangement is that the shooting device mounted on the gimbal 6 can have a good field of view in a horizontal flight, vertically, and in a hovering state. At the same time, the slot 12 can reduce the weight of the fuselage 1.

Figure 13:
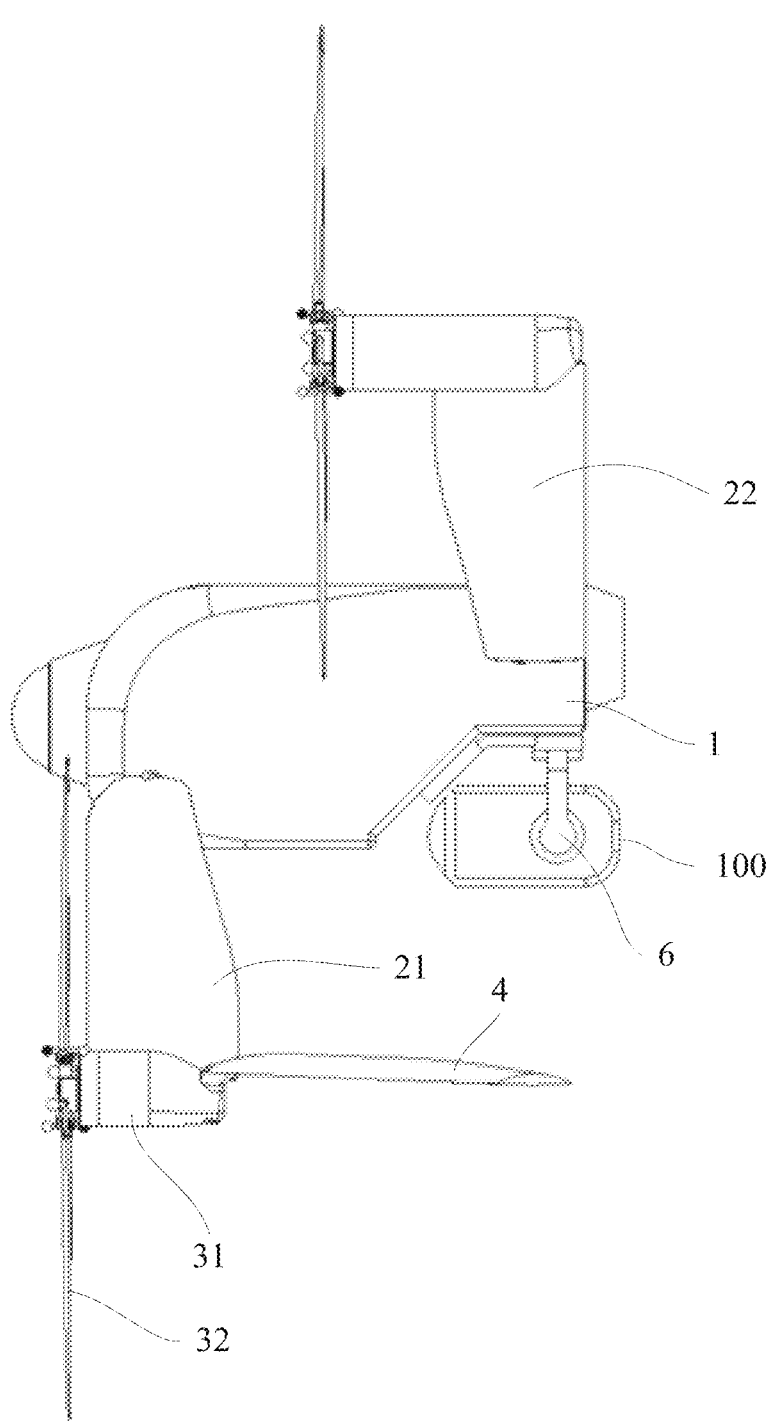
FIG. 13 is a schematic view of the structure of the unmanned aerial vehicle of the embodiment described in FIG. 12 in another direction.
Figure 14:
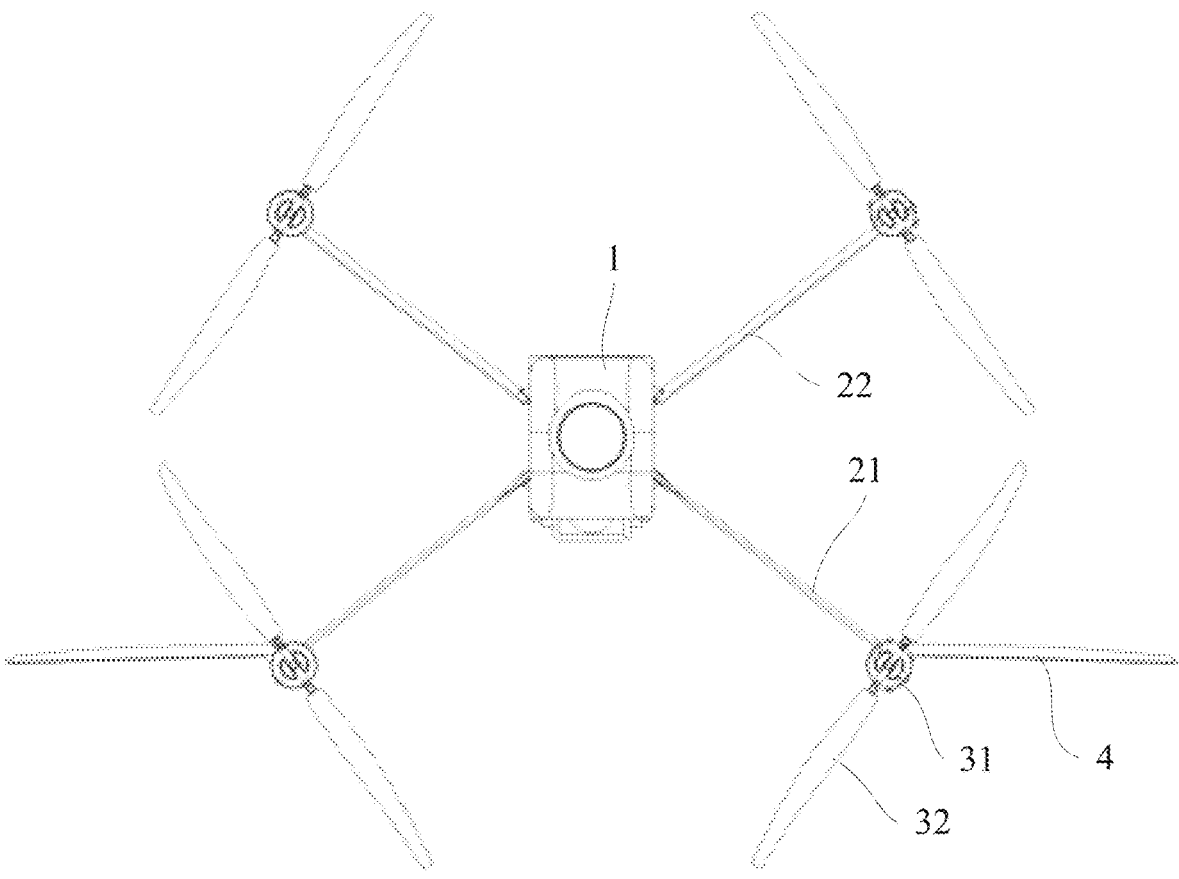
FIG. 14 is a schematic view of the structure of the unmanned aerial vehicle of the embodiment described in FIG. 12 in another direction.
Figure 15:
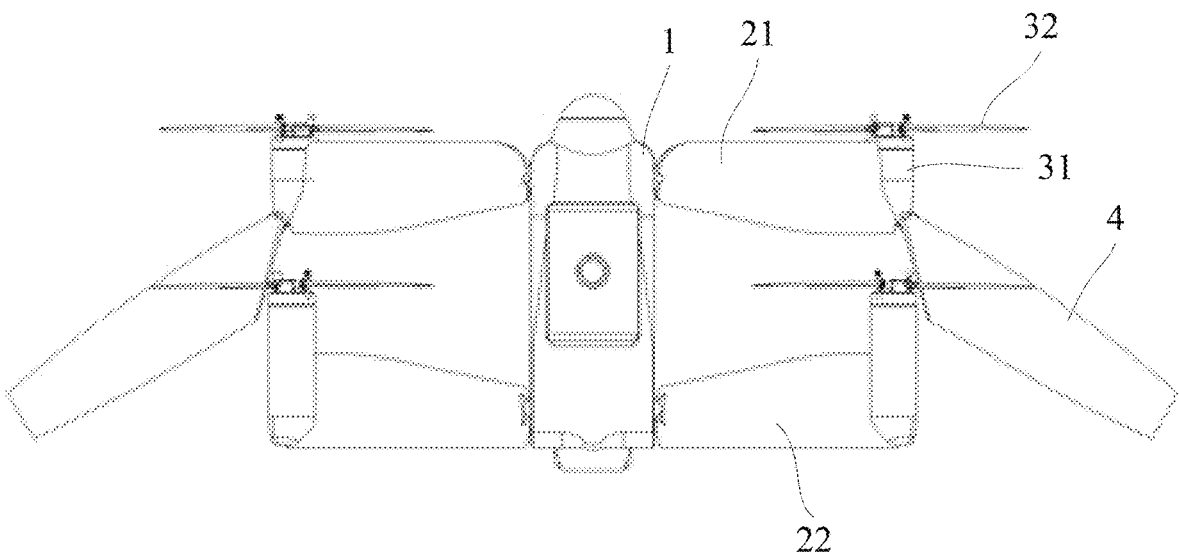
FIG. 15 is a schematic view of the structure of the unmanned aerial vehicle of the embodiment described in FIG. 12 in another direction.

In one embodiment, referring to FIGS. 12 and 13, the slot 12 comprises an inclined surface, the inclined surfaces extending towards the front end of the fuselage 1. The inclined surface is provided to facilitate the mounting of the gimbal 6 and to avoid obstruction by the fuselage 1 of the shooting device on the gimbal 6.

Additional loads may be arranged in front of the vertical take-off and landing fixed-wing UAV, such as the LIDAR in the figure, but also a front-view shooting device and the like. Exemplarily, the front end of the UAV is provided with a second load, and the second load may comprise at least one of a FPV (First Person View) shooting device, a LIDAR, and a front view light. For example, the second load comprises an FPV shooting device; also for example, the second load comprises a LIDAR; also for example, the second load comprises a front view light. The second load may also include other functional modules.

In one embodiment, the battery is fully buried, i.e. the battery is stowed within the fuselage 1.

Existing VTOL UAVs, whose dimensions have basically reached the level of fixed-wing UAVs with large wings, have poor portability and basically cannot be carried by a single person, which restricts their application scenarios.

In one embodiment of the present application, the front arm 21, the rear arm 22, the bracket 4 and the paddle 32 can be folded, i.e., the vertical take-off and landing fixed-wing unmanned aerial vehicle can also be switched between the folded and unfolded states, and the structural realization mode of the vertical take-off and landing fixed-wing unmanned aerial vehicle switching between the folded and unfolded states can be found in the description of the corresponding portion of the abovementioned embodiment one, and will not be further elaborated. The vertical take-off and landing fixed-wing UAV in the folded and stowed state has the advantages of compactness, regularity, and good portability.

Therein, a schematic diagram of the vertical take-off and landing fixed-wing unmanned aerial vehicle in a folded state according to one embodiment of the present disclosure is shown in FIGS. 17 to 20, and the structure of the vertical take-off and landing fixed-wing unmanned aerial vehicle in a folded state can be seen in the description of the corresponding portion of the above-described Example 1.

Exemplarily, the folding process of a vertical take-off and landing fixed-wing unmanned aerial vehicle is briefly described as follows:

(1), folding bracket 4: Fold the bracket 4 around its mounting axis toward the front arm 21, folding it to a state where the two are substantially overlapping;

(2) Fold the front arm 21: Fold the front arm 21 together with the folded winglets backward to a folded stowed position close to the fuselage 1;

(3) Folding the rear arm 22: Fold the rear arm 22 forward to a folded stowed position close to the fuselage 1;

(4), Organize the collapsible paddle 32 to a folded storage position against the fuselage 1.

The remaining undescribed portions can be found in the description of the corresponding portions of Example I. Without conflict, the embodiments of Example 1 apply to the vertical take-off and landing fixed-wing unmanned aerial vehicle of Example 2.

One embodiment of the present application also provides a vertical take-off and landing fixed-wing unmanned aerial vehicle, the vertical take-off and landing fixed-wing unmanned aerial vehicle comprising a fuselage 1, at least four arms 2 attached to the fuselage 1, and propellers 3 attached to one end of each of the arms 2 away from the fuselage 1. Therein, the arms 2 are in the shape of a second wing, and the second wing is in the form of a sheet structure. The arms 2 are used to provide lift to the fuselage 1 when the vertical take-off and landing fixed-wing unmanned aerial vehicle is flying forward.

It should be noted that, in this document, relational terms such as first and second are used only to distinguish one entity or operation from another, and do not necessarily require or imply the existence of any such actual relationship or order between those entities or operations. The terms "including", "comprising", or any other variant thereof, are intended to cover non-exclusive inclusion, so that a process, method, article or apparatus comprising a set of elements includes not only those elements, but also other elements that are not expressly enumerated, or that a process, method, article or apparatus comprising a set of elements for such a process, method, article or apparatus is also included. Or it also includes elements that are inherent to such process, method, article or apparatus. Without further limitation, the fact that an element is defined by the phrase "includes a" does not preclude the existence of another identical element in the process, method, article or apparatus that includes the said element.

The unmanned aerial vehicle provided by some embodiments of the present application is described in detail above, and specific examples are applied herein to illustrate the principles and implementation of the present application, and the description of the above embodiments is only used to help understand the method of the present application and its core ideas; at the same time, for the general technical personnel in the field, based on the ideas of the present application, there will be changes in the specific implementation and the scope of the application, which should not be construed as limiting the present application. In summary, the contents of this specification should not be construed as a limitation of this application.

The above mentioned is only a specific implementation of the present application, but the scope of protection of the present application is not limited to this, and any person skilled in the art can easily think of various equivalent modifications or substitutions within the technical scope disclosed in the present application, which should be covered by the scope of protection of the present application.

Therefore, the scope of protection of this application shall be subject to the scope of protection of the claims.

What is claimed is:

1. An aerial vehicle, comprising:
a fuselage;
a plurality of propellers coupled to the fuselage;
at least two front arms coupled to the fuselage, each front arm including a first end connected to the fuselage, and a second end connected to one of the plurality of propellers, and the second end being opposite to the first end;
at least two brackets connected in correspondence with the at least two front arms, each bracket including an end connected to the second end of the corresponding one front arm, and the at least two brackets being configured to support the aerial vehicle when the aerial vehicle is not taking off or is landed; and
a rear arm coupled to the fuselage, wherein a position where the rear arm is connected to the fuselage and a position where one of the at least two front arms is connected to the fuselage are staggered in a height direction of the fuselage, and when the aerial vehicle is upright and placed horizontally, the position where the rear arm is connected to the fuselage is higher than the position where the one of the at least two front arms is connected to the fuselage;
wherein:
the aerial vehicle has at least a taking off or landing state and a cruise state;
in response to the aerial vehicle being in the taking off or landing state, an angle between a longitudinal axis of the fuselage and a horizontal plane is within a first angular range;
in response to the aerial vehicle being in the cruise state, the angle between the longitudinal axis of the fuselage and the horizontal plane is within a second angular range, and a maximum value of the second angular range is less than a minimum value of the first angular range; and
in response to the aerial vehicle switching between the taking off or landing state and the cruise state, the fuselage and the plurality of propellers tilt as a whole.

2. The aerial vehicle according to claim 1, wherein the first angular range is from 30° to 90°, inclusive.

3. The aerial vehicle according to claim 1, wherein in response to the aerial vehicle switching to the cruise state, the at least two front arms are able to act as wings of a vertical take-off and landing fixed-wing aerial vehicle.

4. The aerial vehicle according to claim 3, wherein the rear arm is one of two rear arms, ends of the at least two front arms away from the fuselage and ends of the two rear arms away from the fuselage are provided with four visual sensors respectively, and each pair of shooting angles of the four visual sensors partially overlap and form a binocular vision module, so that the four visual sensors form four binocular vision modules.

5. The aerial vehicle according to claim 4, wherein each of the vision sensors is obliquely mounted on a corresponding arm so as to tilt an optical axis of each of the vision sensors relative to an axis of a motor on the corresponding arm.

6. The aerial vehicle according to claim 4, wherein the vision sensors comprise a first vision sensor disposed at an end of each of the at least two front arms away from the fuselage and a second vision sensor disposed at an end of each of the two rear arms away from the fuselage; and the first vision sensor has a shooting direction towards front of the fuselage and the second vision sensor has a shooting direction towards rear of the fuselage.

7. The aerial vehicle according to claim 4, wherein each of the vision sensors is obliquely mounted on a motor on a corresponding arm.

8. The aerial vehicle according to claim 4, wherein:
the visual sensors comprise a first visual sensor disposed at an end of each of the at least two front arms away from the fuselage and a second visual sensor disposed at an end of each of the two rear arms away from the fuselage; and
the first vision sensor is disposed below the end of each of the at least two front arms away from the fuselage, and the second vision sensor is disposed above the end of each of the two rear arms away from the fuselage.

9. The aerial vehicle according to claim 4, wherein:
the visual sensors comprise first visual sensors disposed at ends of the at least two front arms away from the fuselage and second visual sensors disposed at ends of the two rear arms away from the fuselage; and
the first vision sensors are symmetrically provided on both sides of the fuselage respectively and the second vision sensors are symmetrically provided on both sides of the fuselage respectively.

10. The aerial vehicle according to claim 1, further comprising a gimbal fixed to the fuselage for carrying a first load, the first load comprising at least a filming device.

11. The aerial vehicle according to claim 1, wherein:
the plurality of propellers comprise motors fixed to ends of corresponding arms away from the fuselage and paddles disposed on the motors, the motors being configured to drive the paddles to rotate, the motors comprising a first motor coupled to one end of each of the at least two front arms away from the fuselage and a second motor coupled to one end of the rear arm away from the fuselage, the paddles comprising a first paddle disposed on the first motor and a second paddle disposed on the second motor; and
when the aerial vehicle is at the cruise state, projections of paddle disks formed by rotation of the first paddle and the second paddle on the same side of the fuselage on a surface parallel to a paddle plane do not overlap.

12. The aerial vehicle according to claim 11, wherein the first paddle is mounted above the first motor and the second paddle is mounted below the second motor.

13. The aerial vehicle according to claim 1, wherein:
the at least two front arms are each pivotably connected to the fuselage, and the at least two brackets are pivotally connected to the corresponding one of the at least two front arms;
the at least two front arms are rotated relative to the fuselage and the at least two brackets are rotated relative to the at least two front arms to allow the aerial vehicle to be selectively in an unfolded state or a folded state;
in the unfolded state, the at least two front arms each form an angle with the fuselage, and the at least two brackets each form an angle with the corresponding one of the at least two front arms; and
in the folded state, the at least two front arms are affixed to the fuselage and the at least two brackets each are affixed to the corresponding one of the at least two front arms.

14. The aerial vehicle according to claim 13, wherein, in the folded state, the fuselage, the at least two front arms, and the at least two brackets are in a same lengthwise direction, the fuselage is in the lengthwise direction parallel to a direction of a line connecting a front end of the fuselage to a back end of the fuselage, and the at least two front arms and the at least two brackets are in the direction of their respective extensions.

15. The aerial vehicle according to claim 14, wherein:
in the folded state, each of the at least two front arms is affixed to a side wall of the fuselage on the corresponding side or each of the at least two front arms is affixed to the bottom of the fuselage.

16. An unmanned aerial vehicle, comprising:
a fuselage;
two front arms and two rear arms, the two front arms being symmetrically connected to a front end of the fuselage and the two rear arms being symmetrically connected to a rear end of the fuselage, wherein each of the two rear arms is coupled to the fuselage, a position where one of the two rear arms is connected to the fuselage and a position where one of the two front arms is connected to the fuselage are staggered in a height direction of the fuselage, and when the aerial vehicle is upright and placed horizontally, the position where the one of the two rear arms is connected to the fuselage is higher than the position where the one of the two front arms is connected to the fuselage;
four propellers at ends of the two front arms away from the fuselage and ends of the two rear arms away from the fuselage respectively, each front arm including a first end connected to the fuselage, and a second end connected to one of the four propellers, and the second end being opposite to the first end;
two brackets connected in correspondence with the two front arms, each bracket including an end connected to the second end of the corresponding one front arm, and the two brackets being configured to support the aerial vehicle when the aerial vehicle is not taking off or is landed; and
four visual sensors at the ends of the two front arms away from the fuselage and the ends of the two rear arms away from the fuselage respectively;
wherein:
the unmanned aerial vehicle has at least a taking off or landing state and a cruise state;
in response to the unmanned aerial vehicle being in the taking off or landing state, an angle between a longitudinal axis of the fuselage and a horizontal plane is within a first angular range;
in response to the unmanned aerial vehicle being in the cruise state, the angle between the longitudinal axis of the fuselage and the horizontal plane is within a second angular range, and a maximum value of the second angular range is less than a minimum value of the first angular range;
in response to the unmanned aerial vehicle switching between the taking off or landing state and the cruise state, the fuselage and the four propellers tilt as a whole; and
each pair of shooting angles of the four visual sensors partially overlap and form a binocular vision module so that the four visual sensors form four binocular vision modules.

17. The unmanned aerial vehicle according to claim 16, wherein the vision sensors are obliquely mounted on corresponding arms so as to tilt optical axes of the vision sensors relative to axial directions of motors on the corresponding arms.

18. The aerial vehicle according to claim 1, further comprising:

a gimbal located at a lower rear end of the fuselage; and a LIDAR or a first person view (FPV) shooting device located at a front end of the fuselage.

19. An aerial vehicle, comprising:

a fuselage;

a plurality of propellers coupled to the fuselage;

at least two front arms coupled to the fuselage, each front arm including a first end connected to the fuselage, and a second end connected to one of the plurality of propellers, and the second end being opposite to the first end; and at least two brackets connected in correspondence with the at least two front arms, each bracket including an end connected to the second end of the corresponding one front arm, and the at least two brackets being configured to support the aerial vehicle when the aerial vehicle is not taking off or is landed;

wherein:

the aerial vehicle has at least a taking off or landing state and a cruise state;

in response to the aerial vehicle being in the taking off or landing state, an angle between a longitudinal axis of the fuselage and a horizontal plane is within a first angular range;

in response to the aerial vehicle being in the cruise state, the angle between the longitudinal axis of the fuselage and the horizontal plane is within a second angular range, and a maximum value of the second angular range is less than a minimum value of the first angular range;

in response to the aerial vehicle switching between the taking off or landing state and the cruise state, the fuselage and the plurality of propellers tilt as a whole;

the at least two front arms are each pivotably connected to the fuselage, and the at least two brackets are pivotally connected to the corresponding one of the at least two front arms;

the at least two front arms are rotated relative to the fuselage and the at least two brackets are rotated relative to the at least two front arms to allow the aerial vehicle to be selectively in an unfolded state or a folded state;

in the unfolded state, the at least two front arms each form an angle with the fuselage, and the at least two brackets each form an angle with the corresponding one of the at least two front arms; and p2 in the folded state, the at least two front arms are affixed to the fuselage and the at least two brackets each are affixed to the corresponding one of the at least two front arms.

\*   \*   \*   \*   \*